(12) United States Patent
Lockett

(10) Patent No.: US 11,270,225 B1
(45) Date of Patent: *Mar. 8, 2022

(54) METHODS AND APPARATUS FOR ASYNCHRONOUS AND INTERACTIVE MACHINE LEARNING USING WORD EMBEDDING WITHIN TEXT-BASED DOCUMENTS AND MULTIMODAL DOCUMENTS

(71) Applicant: CS Disco, Inc., Houston, TX (US)

(72) Inventor: Alan Lockett, Sugar Land, TX (US)

(73) Assignee: CS Disco, Inc., Houston, TX (US)

( * ) Notice: Subject to any disclaimer, the term of this patent is extended or adjusted under 35 U.S.C. 154(b) by 786 days.

This patent is subject to a terminal disclaimer.

(21) Appl. No.: 16/101,090

(22) Filed: Aug. 10, 2018

Related U.S. Application Data

(63) Continuation of application No. 15/635,361, filed on Jun. 28, 2017, now Pat. No. 10,062,039.

(51) Int. Cl.
*G06N 20/00* (2019.01)
*G06N 3/04* (2006.01)
*G06N 3/08* (2006.01)

(52) U.S. Cl.
CPC .......... *G06N 20/00* (2019.01); *G06N 3/0445* (2013.01); *G06N 3/0454* (2013.01); *G06N 3/084* (2013.01)

(58) Field of Classification Search
CPC ........ G06N 99/005; G06N 5/02; G06N 5/022; G06N 5/04; G06N 7/005; G06N 20/00; G06N 3/0445; G06N 3/084; G06N 3/0454; G06F 19/345; G06F 17/30867; G06F 17/2229; G06F 17/241

USPC .......................................................... 706/11
See application file for complete search history.

(56) References Cited

U.S. PATENT DOCUMENTS

| | | | |
|---|---|---|---|
| 6,728,695 B1* | 4/2004 | Pathria | G06F 16/313 |
| 9,058,327 B1* | 6/2015 | Lehrman | G06F 16/93 |
| 10,062,039 B1 | 8/2018 | Lockett | |
| 10,108,902 B1 | 10/2018 | Lockett | |
| 2005/0027664 A1* | 2/2005 | Johnson | G06F 40/45 |
| | | | 706/12 |
| 2007/0150801 A1* | 6/2007 | Chidlovskii | G06K 9/6264 |
| | | | 715/210 |
| 2008/0082466 A1* | 4/2008 | Meijer | G06N 7/005 |
| | | | 706/12 |

(Continued)

OTHER PUBLICATIONS

Office Action for U.S. Appl. No. 15/635,361, dated Aug. 18, 2017, 16 pages.

(Continued)

*Primary Examiner* — Dave Misir
(74) *Attorney, Agent, or Firm* — Cooley LLP

(57) ABSTRACT

A machine learning system continuously receives tag signals indicating membership relations between data objects from a data corpus and tag targets. The machine learning system is asynchronously and iteratively trained with the received tag signals to identify further data objects from the data corpus predicted to have a membership relation with the single tag target. The machine learning system constantly improves its predictive accuracy in short time by the continuous training of a backend machine learning model based on implicit and explicit tag signals gathered from a nonintrusive monitoring of user interactions during a review process of the data corpus.

20 Claims, 12 Drawing Sheets

(56) References Cited

U.S. PATENT DOCUMENTS

| | | | | |
|---|---|---|---|---|
| 2008/0228749 | A1* | 9/2008 | Brown | G06F 16/78 |
| 2011/0103682 | A1* | 5/2011 | Chidlovskii | H04L 51/32 |
| | | | | 382/159 |
| 2012/0123978 | A1* | 5/2012 | Toderice | G06K 9/00718 |
| | | | | 706/12 |
| 2016/0098645 | A1* | 4/2016 | Sharma | G06N 20/00 |
| | | | | 706/12 |
| 2016/0371261 | A1* | 12/2016 | Cormack | G06F 16/35 |
| 2017/0060835 | A1* | 3/2017 | Radford | G06F 16/288 |
| 2017/0185872 | A1* | 6/2017 | Chakraborty | G06K 9/66 |
| 2017/0278510 | A1* | 9/2017 | Zhao | G10L 15/04 |
| 2019/0188564 | A1 | 6/2019 | Lockett | |

OTHER PUBLICATIONS

Office Action for U.S. Appl. No. 15/635,361, dated Jan. 16, 2018, 8 pages.

Office Action for U.S. Appl. No. 15/707,621, dated Dec. 14, 2017, 24 pages.

Collobert, R. et al., "Natural language processing (almost) from scratch," Journal of Machine Learning Research, vol. 12, 2011, pp. 2493-2537. Available online at https://arxiv.org/pdf/1103.0398.pdf.

Cormack, G. V. et al., "Evaluation of machine-learning protocols for technology-assisted review in electronic discovery," SIGIR'14, Jul. 6-11, 2014, Gold Coast, Queensland, Australia, pp. 153-162. Available online at http://plg2.cs.uwaterloo.ca/~gvcormac/calstudy/study/sigir2014-cormackgrossman.pdf.

Denil, M. et al., "Extraction of salient sentences from labelled documents," Feb. 28, 2015, pp. 1-9. Available online at https://arxiv.org/pdf/ 1412.6815.pdf.

Funk, S., "RMSprop loses to SMORMS3—Beware the Epsilon!," Apr. 20, 2015, 2 pages. Available online at ttp://sifter.org/~simon/journal/20150420.html.

Google, Deep Dream Generator, "Human Machine Collaboration," 2015, 5 pages. Available online at https://deepdreamgenerator.com.

Hinton, G. et al., "Neural Networks for Machine Learning," Lecture 6a, Overview of Mini-batch Gradient Descent, 2013, 31 pages. Available online at http://www.cs.toronto.edu/~tijmen/csc321/slides/lecture_slides_lec6.pdf.

Johnson, R. et al., "Effective Use of Word Order for Text Categorization with Convolutional Neural Networks," 2015, 10 pages. Available online at https://arxiv.org/pdf/1412.1058.pdf.

Kalchbrenner, N. et al., "A Convolutional Neural Network for Modelling Sentences," 2014, 11 pages. Available online at https://arxiv. org/pdf/1404.2188.pdf.

Kim, Y., "Convolutional Neural Networks for Sentence Classification," 2014, 6 pages. Available online at https://arxiv.org/pdf/1408.5882.pdf.

Kingma, D. P. et al., "Adam: A method for stochastic optimization," In Proceedings of the 2017 International Conference on Learning and Representations (ICLR-17), Published as a conference paper ICLR 2015, 2017, 15 pages. Available online at https://arxiv.org/pdf/ 1412.6980.pdf.

Mikolov, T. et al., "Efficient estimation of word representations in vector space," In Proceedings of the 2013 International Conference on Learning and Representation, 2013, 12 pages. Available online at https://arxiv.org/pdf/1301.3781.pdf.

Nair, V. et al., "Rectified linear units improve restricted boltzmann machines," In Proceedings of the 27th Conference on Neural Information Processing Systems, 2010, 8 pages. Available online at http://machinelearning.wustl. edu/mlpapers/paper_files/icml2010_NairH10.pdf.

Olsson, F., "A literature survey of active machine learning in the context of natural language processing," SICS Technical Report T2009:06, ISSN: 1100-3154, Apr. 17, 2009, 59 pages. Available online at http://eprints.sics.se/3600/.

Pennington, J. et al., "GLoVe: Global Vectors for Word Representation," 2014, 77 pages. Available online at https://nlp.stanford.edu/pubs/glove.pdf.

Yang, Z. et al., "Hierarchical attention networks for document classification," In Proceedings of the 15th Conference of the North American Chapter of the Association of Computational Linguistics, San Diego, California, Jun. 12-17, 2016, pp. 1480-1489. Available online at https://www.cs.cmu.edu/~hovy/papers/16HLT-hierarchical-attention-networks.pdf.

Bau, D. et al., "Network dissection: Quantifying interpretability of deep visual representations," 2017, 9 pages. CSAIL, MIT. Available online at https://arxiv.org/pdf/1704.05796.

Bojarski, M. et al., "Explaining how a deep neural network trained with end-to-end learning steers a car," 2017, 8 pages. NVIDIA Corporation. Available online at https://arxiv.org/pdf/1704.07911.pdf.

Kindermans, P-J et al., "PatternNet and PatternLRP: Improving the interpretability of neural networks," 2017, 11 pages. TU—Berlin, Germany. Available online at https://arxiv.org/pdf/1705.5598.

Lai, S. et al., "Recurrent convolutional neural networks for text classification," Proceedings of the Twenty-Ninth AAAI Conference on Artificial Intelligence, pp. 2267-2273 (2015).

Qin, P. et al., "An empirical convolutional neural network approach for semantic relation classification," Neurocomputing, vol. 190, Jan. 2016, pp. 1-9.

Yin, W. et al., "ABCNN: Attention-Based Convolutional Neural Network for Modeling Sentence Pairs," Apr. 9, 2016, 15 pages.

Dong F. et al., "Attention-based Recurrent Convolutional Neural Network for Automatic Essay Scoring," Proceedings of the 21st Conference on Computational Natural Language Learning (CoNLL 2017), Vancouver, Canada, Aug. 3-4, 2017, pp. 153-162.

Kotzias, D. et al., "From Group to Individual Labels using Deep Features," KDD'15, Aug. 10-13, 2015, Sydney, NSW, Australia, pp. 597-606.

International Search Report and Written Opinion for International Application No. PCT/US2018/051424, dated Jan. 15, 2019, 12 pages.

Office Action for U.S. Appl. No. 16/167,205, dated Jun. 25, 2021, 20 pages.

* cited by examiner

From: Holst
Sent: Saturday, October 13, 2001 6:01 PM CDT
To: Grigsby, Mike
CC: Allen, Phillip K.; Smith, Matt
Subject: West Fundies Mike, Following is a west fundies update. We have not yet produced an abundance of finished product, but several great projects are in the development stage. These projects are making nice progress even though it may not be visible to the casual observer.

PRODUCTION

This effort is being led by Tori and supported by both Jay and myself. Gaskill's staff will be providing most of the manpower. The concept is to design a model which takes a methodical and scientific approach in forecasting: (1) declines of existing production, (2) increases due to drilling.

Existing production

Using externally provided production data, we are in the process of dividing production into zones of like characteristics. Each zone will be identified by: Basin --> Reservoir --> Formation. Analysis will be done at the zone level to determine its unique depletion curve. This curve will be extrapolated to forecast future production from existing wells.

New production

From rig count data (or completion data if we buy the more expensive database) we can determine which "zone" a new well is targeting. Forecasted production can then be determined by applying a recent historical success ratio and the corresponding depletion curve identified in the preceding step. The difficult component to forecast with great accuracy is future drilling. Our current thinking is a calculation that considers forward prices, drilling costs (which are increasing since all the "easy wells" have already been drilled), and common required rates of return.

FIG. 9

METHODS AND APPARATUS FOR ASYNCHRONOUS AND INTERACTIVE MACHINE LEARNING USING WORD EMBEDDING WITHIN TEXT-BASED DOCUMENTS AND MULTIMODAL DOCUMENTS

CROSS-REFERENCE TO RELATED APPLICATIONS

This application claims priority to and is a continuation of U.S. patent application Ser. No. 15/635,361, (now U.S. Pat. No. 10,062,039), entitled "METHODS AND APPARATUS FOR ASYNCHRONOUS AND INTERACTIVE MACHINE LEARNING USING WORD EMBEDDING WITHIN TEXT-BASED DOCUMENTS AND MULTIMODAL DOCUMENTS," filed Jun. 28, 2017, which is incorporated herein by reference in its entirety.

FIELD

At least one embodiment described herein relates generally to predictive coding of a data corpus, using machine learning techniques.

BACKGROUND

Parties to litigation typically have to share relevant evidence with opposing counsel through the discovery process. Attorneys typically "meet and confer" to establish criteria for what must be produced, and then each party makes a reasonable search of their records based on these criteria, providing the results to the opposite party. Discovery typically involves the gathering of potentially relevant materials, much of it digital, and then reviewing such materials to determine what to be shared with opposite parties.

A majority of documents are presently created and maintained electronically. The production and storage of electronic documents at high volumes and diversity of such documents produces new challenges regarding preservation, review, and admissibility of evidence. During discovery the electronic data is located, searched, and reviewed for their use in legal proceedings. Discovery involves the selection of appropriate search and information retrieval techniques having high levels of quality assurance and sound rationale regarding why such techniques were employed. Discovery of electronic documents is often a complex and expensive task including the engagement of different actors for the preservation, collection, data processing, and review. Moreover, the timing of discovery is often governed by scheduling orders, resulting in short periods of time designated to review electronic documents.

Therefore, a need exists for machine learning methods and apparatus to prevent expensive and overly time-consuming discovery disputes while maintaining accuracy and high quality standards in the production of evidence.

SUMMARY

At least one embodiment described herein addresses the need for machine learning solutions to support electronic discovery. In some embodiments, a non-transitory medium includes code representing processor-executable instructions; the code causes a processor to receive, via a user interface, a first series of tag signals, each tag signal from the first series indicating a membership relation between at least one data object or document from a data corpus and at least one tag target from a non-empty set of tag targets. The code causes the processor to seed a machine learning model upon a determination that a number of data objects from a first set of data objects having a membership relation with a single tag target from the non-empty set of tag targets has reached a predetermined threshold corresponding to a number of elements of a training set. The code causes the processor to train the machine learning model based on the first set of data objects to identify further data objects from the data corpus predicted to have a membership relation with the single tag target. The code causes the processor to receive, via the user interface, a second series of tag signals. Each tag signal from the second series indicates a membership relation between at least one data object from a second set of data objects and at least one tag target from the non-empty set of tag targets. The second set of data objects includes at least one data object predicted by the machine learning model as having a membership relation with the single tag target and re-trains the machine learning model based on the second set of data objects.

BRIEF DESCRIPTION OF THE DRAWINGS

FIG. 9 is an example of highlighted sections of a data object predicted to be associated with a tag target, according to an embodiment.

DETAILED DESCRIPTION

Figure 1:
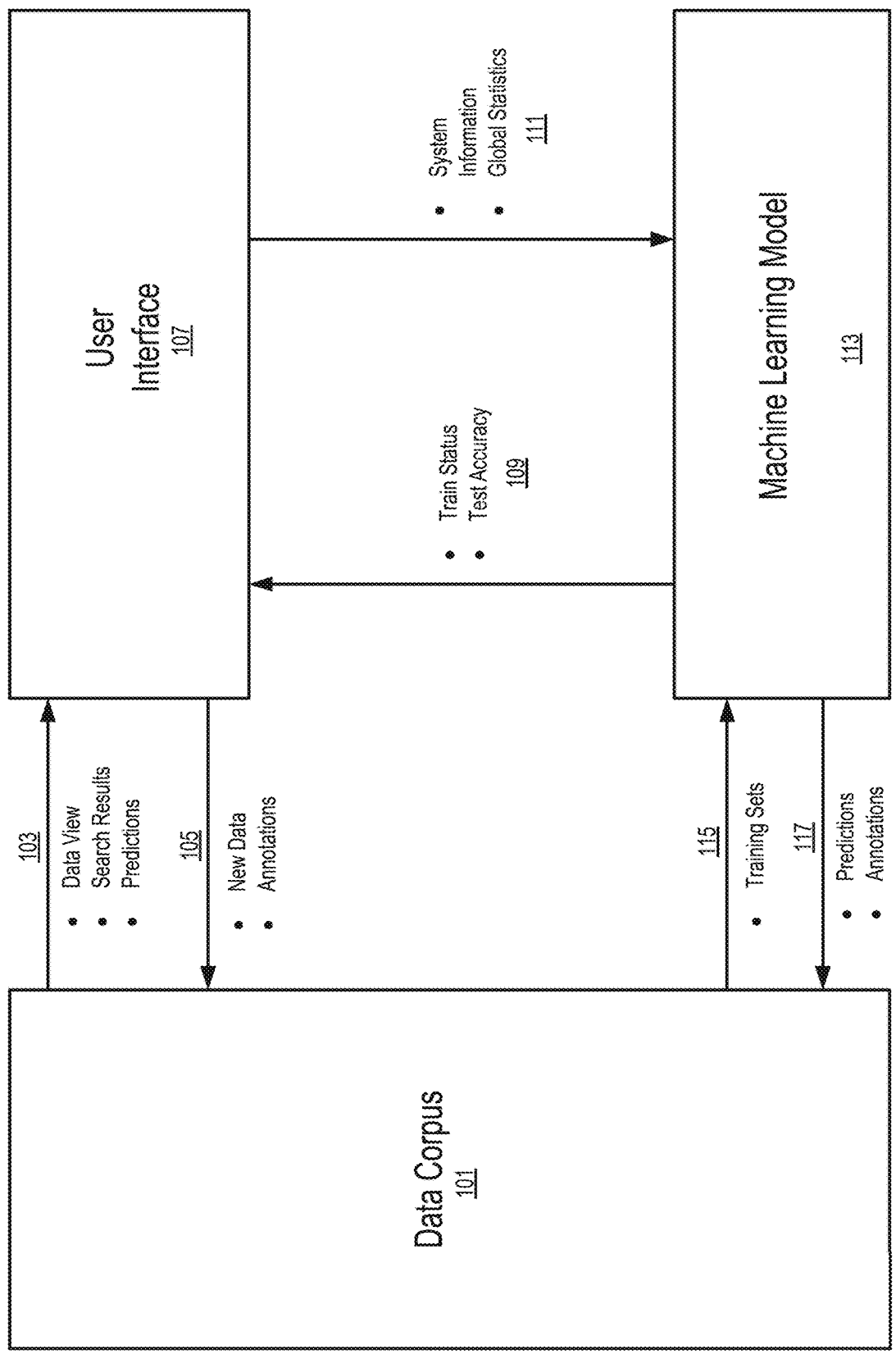
FIG. 1 is a block diagram of an implementation of a system for asynchronous and interactive machine learning using word embedding within text-based and multimodal documents, according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, well-known structures and components are shown in block diagram form to avoid obscuring the concepts of the subject technology.

The terms "computer", "processor", "computer processor", "compute device" or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), or any other electronic computing device comprising one or more processors of any kind, or any combination thereof.

As used herein, the phrase "for example," "such as", "for instance" and variants thereof describe non-limiting embodiments of the presently-disclosed subject matter. Reference in the specification to "for example," "such as", "for instance" or variants thereof means that a particular feature, structure or characteristic described in connection with the embodiment(s) is included in at least one embodiment of the presently-disclosed subject matter. Thus the appearance of the phrase "for example," "such as", "for instance" or variants thereof does not necessarily refer to the same embodiment(s).

It is appreciated that, unless specifically stated otherwise, certain features of the presently-disclosed subject matter, which are, for clarity, described in the context of separate embodiments, may also be provided in combination in a single embodiment. Conversely, various features of the presently-disclosed subject matter, which are, for brevity, described in the context of a single embodiment, can also be provided separately or in any suitable sub-combination.

In some implementations, an Asynchronous and Interactive Machine Learning (AIML) system sorts documents or data objects for legal review during legal discovery according to a predicted likelihood that a reviewer will apply one or more tags to the document or data object. At a general level, the AIML system executes a machine-assisted iterative search over a data corpus. The examples described below are illustrated in the context of legal discovery, however, the AIML system can be analogously used for a variety of applications including business intelligence, investigative research, surveillance, and other suitable contexts. AIML system can be adapted for explorative learning in large corpora including heterogeneous, non-textual data, such as financial data, satellite or medical imagery, or sensor streams.

Interacting elements of some implementations of the AIML system are discussed with reference to FIG. 1. Data corpus 101 can include thousands, millions and sometimes billions of data objects, however, the number of data objects can grow or shrink over time. The nature of the data in the data objects depends on a particular application, for instance, in the context of legal discovery, data objects can include data related to one or more of the parties engaged in a litigation or dispute. Each data object included in data corpus 101 contains a collection of attributes and a set of relationships that the data object holds with respect to other data objects in the corpus. Data objects can be augmented by the AIML system over time to include annotations about how a user interacts with the data objects in the AIML system. An illustrative example of a data object is a text-based document data object produced from text-based documents such as an e-mail, a Portable Document Formal (PDF) file or other suitable digital representation of assembled textual data. In some instances, data objects include metadata; for instance, an e-mail document can include a sender identifier, the recipient identifier, and a timestamp indicating when the e-mail was sent. An email document can further include one or more relationship fields indicating a relationship between such an email and other data objects. For example, an email data object can hold a relationship with a data object containing data of a PDF file that was sent with the email as an attachment. For another example, a first email data object can hold a relationship with a second email data object, which was sent in response to the first email data object. Further details regarding data objects are discussed below with reference to FIG. 5.

In some implementations, user interface 107 includes widgets or graphical controllers to add, remove, view, and annotate data as shown at 105 in the data corpus 101. For instance, a user can make annotations called tags to mark subsets of the data that are of special interest or relevance for a discovery project or add new data to data corpus 101. In some implementations, tag targets can be defined by a user while in other implementations, tag targets can be imported from other previously analyzed data corpus different from data corpus 101. The tag targets defined or included in the AIML system are used by users to classify or code data objects of data corpus 101 with tags. Each tag target is a non-empty subset of the data determined by data attributes and relationships. In some instances, a user's goal in interacting with the system is to mark all data objects belonging to the each tag target with a single corresponding tag.

In some instances, an AIML system produces one output per tag target including a set of data objects within the corpus that are associated with that tag target. At any point in time, for any particular tag target, some portion of the data objects associated with a tag target can be identified and annotated with the corresponding tag by a user. In some instances, when a new data corpus is received or configured at the AIML system, none of the data objects in the data corpus are initially associated with a tag target. Users can view data objects included in data corpus 101, search for keywords, and receive predictions (as shown at 103). In some implementations, predictions can include one or more data objects, a predicted tag target or membership relation to a tag target and a probability, likelihood, or membership degree associated with such a prediction or membership relation. In some instances, predictions in the form of probability can be received by a user via user interface 107 indicating a probability that a particular user will mark or annotate a data object with a certain tag. In some other instances, predictions in the form of a membership relation between a data object and a tag target can be received by a user via user interface 107 indicating a membership degree between a data object and one or more distinct tag targets.

Iterative machine learning model 113 analyzes user interactions to (a) recommend to a user those data objects which are likely to belong (e.g. predictions) to each tag target, and (b) to produce additional data annotations visible to the user that assist in identifying all data objects in the tag target, as shown at 117. An example of such annotations is discussed below with reference to FIG. 8. In some instances, a user can terminate interactions with data corpus 101 via the AIML system when the user concludes that all data objects in each tag target have been marked with a tag target.

In some implementations, machine learning model 113 is used to annotate data objects in the data corpus in part or in whole with new information, including the machine's predictions regarding tag targets as well as ancillary data such as highlighting, described below with reference to FIG. 9. The user continues to annotate data objects, now with the additional support or suggestions produced by machine learning model 113 through, for instance, machine-generated annotations. Machine learning model 113 is continuously refit to the current state of the annotations, either with or without re-initialization of model parameters. Such retraining of machine learning model 113 is an event triggered by the arrival of a sufficient amount of data determined, for example, based on a threshold corresponding to a constant number of elements of a training set.

In some implementations, annotations used during the training phase of machine learning model 113 can include positive decisions to tag one or more documents. Likewise, negative decisions can be inferred when, for example, a user explicitly marks a document as reviewed without accepting or applying a predicted tag or when the user manually applies a different tag to a document object than the predicted tag. These positive and negative decisions are referred to herein as tag signals. In some implementations, annotations can include other data, such as information about whether a document object has been viewed by a user without applying any tag, or global information such as the results of sampling exploration to determine the prevalence of a tag target, shown at 111. In some implementations, machine learning model 113 can be fit or trained for a first time after a threshold of, for example, fifty data objects positively tagged with the same tag target has been reached. Data objects included in training sets 115 are extracted from data corpus 101.

In some implementations, the AIML system retrains machine learning model 113 whenever the model has been trained after a first time and either some new tag target has reached the predetermined threshold of positive signals or else a previously trained tag has received a number of new tag signals that is multiple of the predetermined threshold, for instance, when the number of new tag signals reaches two times the constant number of elements of a training set. In some instances, the tag signals can indicate a user's confirmation, correction, or dismissal (negative signal) of a predicted output produced by the AIML system. Thus, in some instances, the AIML system can retrain machine learning model 113 after receiving confirmation, correction or dismissal tag signals, improving the AIML system predictive accuracy, resulting in, for example, a lesser number of false positive or false negative predictive outputs. The threshold corresponding to a constant number of elements of a training set is a parameter that can be configured, for instance, via user interface 107. In other words, in some implementations, predetermined thresholds are not hard-coded in the AIML system but rather, can be defined by a user via user interface 107. Accordingly, in some instances, the AIML system can initiate the training of machine learning model 113 as early as the first positive signal arrives data corpus 101 and can continue retraining model 113 in sequence or in parallel without interruptions to users of the AIML system.

Training status, indicating for instance, whether machine learning model 113 has been trained with respect to a particular tag target and predictive accuracy 109 of machine learning model 113 can be displayed to a user via user interface 107. After being trained, machine learning model 113 writes at 117 machine-generated judgements, predictions, annotations, and other suitable data into data corpus 101.

Internal structures of an implementation of an AIML server 200 are discussed with reference to the compute device shown in FIG. 2. Bus 225 represents system, peripheral, and/or chipset buses that communicatively couple numerous internal devices of AIML server 200. For instance, bus 225 communicatively couples processor 201 with read-only memory 211, system memory 215, network communication interface 217, and user interface 107. Processor 201 can retrieve instructions and data structures to execute the processes of embodiments described herein from system memory 215, ROM 211 or other suitable memory coupled to AIML server 200.

Processor 201 can be a single processor, a multi-core processor, or an arrangement of processors in different implementations. In some instances, processor 201 can be any suitable processor such as, for example, a general-purpose processor, a field programmable gate array (FPGA), an application specific integrated circuit (ASIC), a Graphical Processing Unit (GPU), a virtual processor, and/or other suitable hardware device.

ROM 211 stores static data and instructions used by processor 201 and/or other components of AIML server 200. System memory 215 can be a read-and-write memory device. System memory 215 stores some of the processor-executable instructions and data structures that processor 201 uses at runtime, for instance, processor-executable instructions to run tokenizer 203, word embedder 205, feature extractor 207, machine learning model 113, and run other suitable processes of the AIML server 200. Likewise, system memory 215 can store data corpus 101, a set of tag targets 219 and other suitable data structures used by the AIML server 200. Data corpus 101 includes data objects having attributes and logic relationships with other data objects. Tag targets 219 represent classes to which data objects can belong, for instance, a data object can be a member of a class defined by a first tag target and a second tag target.

Tokenizer 203 tokenizes text-based documents into words, then converts each word into a vocabulary index to produce a sequence of M positive integers, each integer associated with an index of a token in the vocabulary. Word embedder 205 can include multiple models to map words into a continuous vector-space based on the words' distributional properties as observed in a raw data corpus. Feature extractor 207 encodes data objects into a feature space X based on data objects' attributes and annotations. Machine learning model 113 can include one or more of an artificial neural network model, probabilistic model, supervised machine learning model, unsupervised machine learning model, deep learning models, and other suitable models.

User interface 107 enables users or non-person entities to interact with the AIML server 200. User interface 107 receives inputs such as, tag signals, document annotations, new defined tag targets and other suitable inputs. User interface 107 produces outputs related to monitored user interactions with the AIML system, data objects, search results, predictions and other suitable outputs. In some implementations, user interface can include a graphical user interface with a collection of controllers or widgets to support user interactions.

Figure 2:
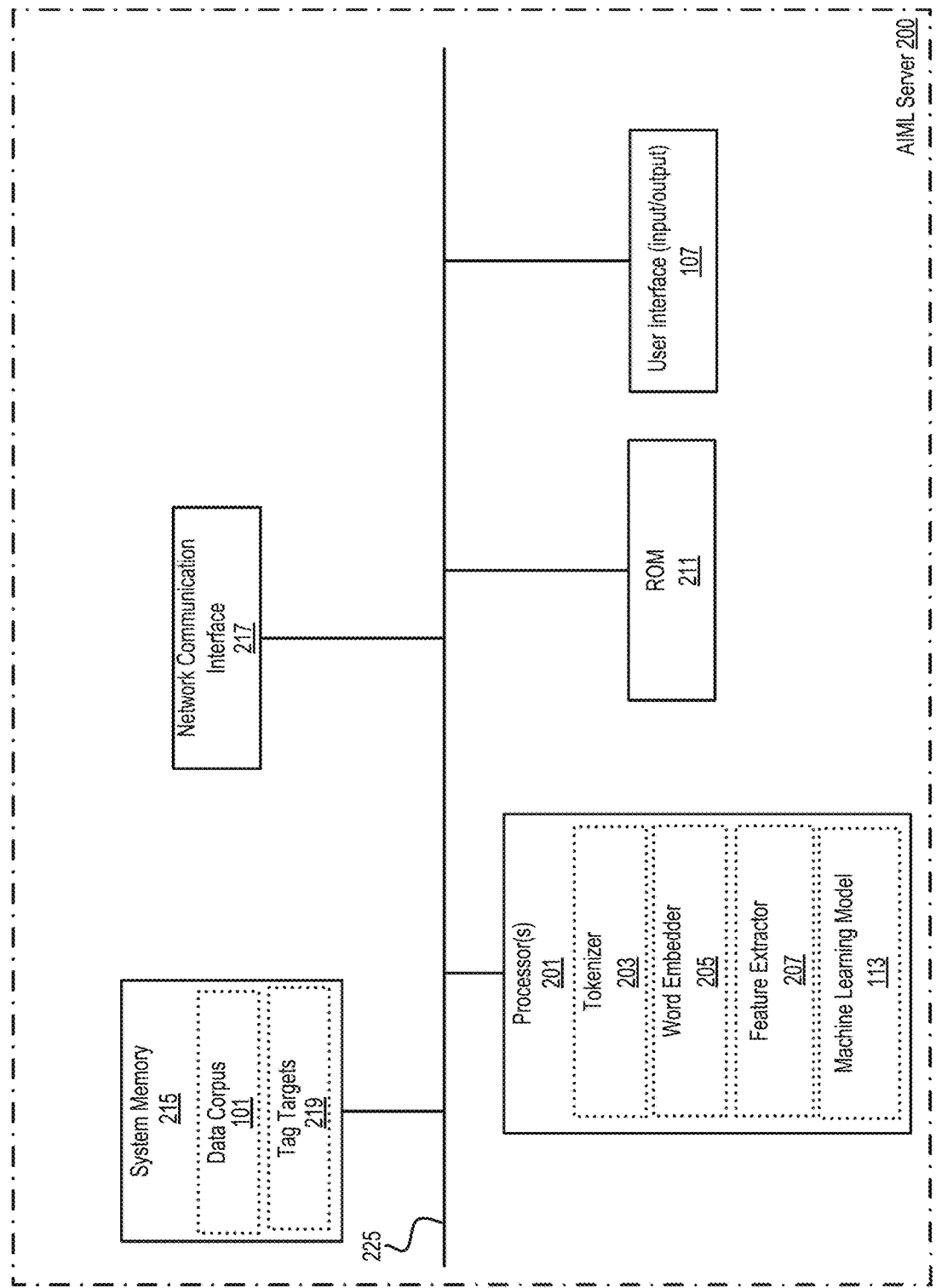
FIG. 2 is an example of a compute device configuration for an implementation of a system for asynchronous and interactive machine learning using word embedding within text-based and multimodal documents, according to one embodiment.

Network communication interface 217 communicatively couples AIML server 200 to a network (not shown in FIG. 2). Network communication interface 217 can include one or more network interface cards (NICs). In some implementations, network communication interface 217 can employ connection protocols including, direct connect, Ethernet (thick, thin, twisted pair 10/100/1000 Base T, and/or the like), Token Ring, wireless connection such as IEEE 802.11a-x, and/or the like. In some implementations, multiple network communication interfaces 217 can be used to engage with various communications networks. For instance, multiple network communication interfaces 217 can be used to enable communications of AIML server 200 over broadcast, multicast, and/or unicast networks (not shown in FIG. 2). Thus, AIML server 200 can be part of network (e.g., network 1207 shown in FIG. 12) to provide services to a user with a client compute device, for instance, to user 1203 via client compute device 1201 discussed below with reference to FIG. 12.

Figure 3:
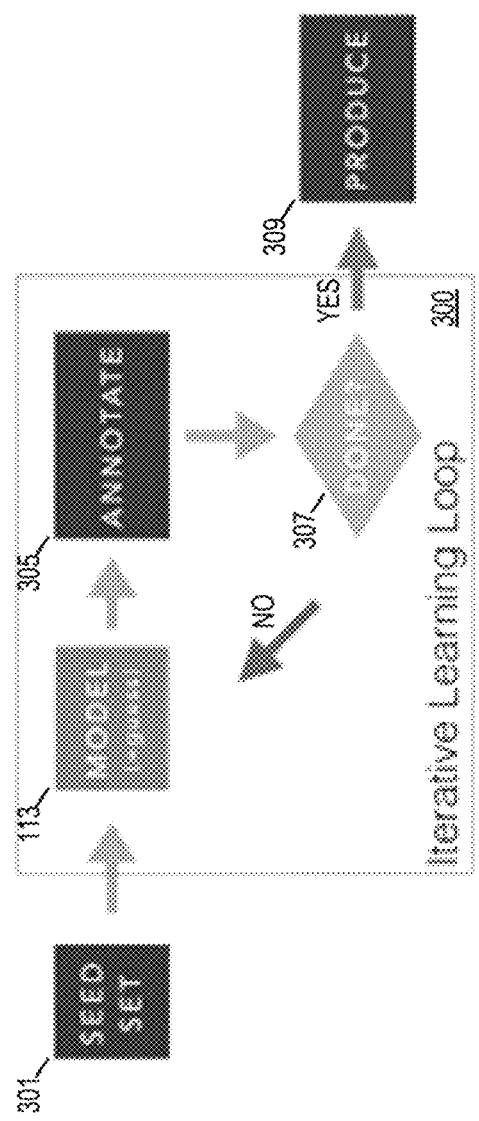
FIG. 3 is a flowchart illustrating an iterative machine learning system, according to one embodiment.

An iterative learning process is described with reference to FIG. 3, in which data corpus 101 is progressively annotated by machine learning model 113 and reviewers with support of the AIML system. In some implementations, the AIML system can use seed set 301 to train machine learning model 113. Thereafter, machine learning model 113 is trained to mirror decisions deduced from seed set 301 to generate predictive coding on data objects in a data corpus, for example, data corpus 101 discussed with reference to FIG. 1. Machine learning model 113 can then generate annotations to the data corpus. Such annotations can be, for instance, predictions on whether a data object in data corpus 101 is likely to be marked by a user with a given tag target. In some instances, users can generate annotations or associations between data objects and a tag targets. Further training can be performed as more data objects are coded or annotated.

Termination of iterative learning loop 300 is determined through conditional statement 307. In some implementations, iterative learning loop 300 can be terminated after all data objects in data corpus 101 are annotated with a tag target that is, a produced annotated version (e.g., 309) of data corpus 101. In some other implementations, iterative learning loop 300 can be terminated after machine learning model has reached a predetermined threshold or accuracy level. In some instances, when conditional statement 307 is not satisfied, machine learning model is retrained using, for example, new annotations received by users.

In some implementations, at an initial state of iterative learning process 300, no data objects in data corpus 101 have been annotated. From that point, users of the AIML system can add annotations to data objects in the data corpus via user interface 107. In some instances, users can specify directly or indirectly tag targets to be modeled by machine learning model 113. Once a sufficient amount of annotations has been added, machine-learning model 113 is fit to the annotated data. In some implementations, the determination of whether a sufficient amount of annotations has been added to machine learning model 113 can be based on a comparison between a number of added annotations associated with a tag target and a predetermined threshold corresponding to a constant number of elements of a training set.

Figure 4:
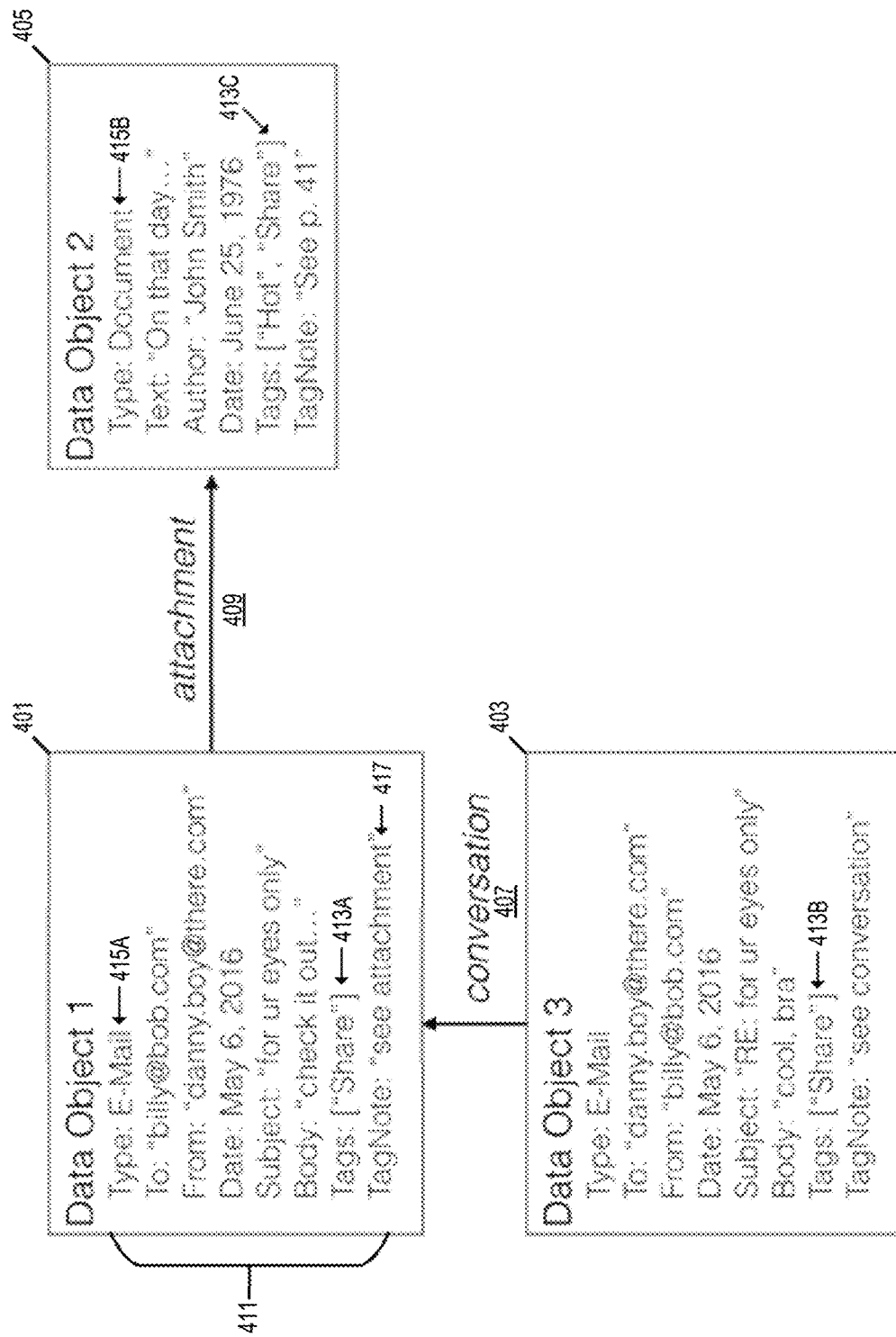
FIG. 4 is a block diagram illustrating data objects, data object attributes, and logical relations between data objects, according to an embodiment.

Examples of data objects such as the ones stored in data corpus 101 are discussed with reference to FIG. 4. Data objects 401, 403, and 405 are examples of data objects generated from an exchange of emails between two individuals. As discussed above, data objects can include a set of attributes (e.g., 411) and logical relations (e.g., 409 and 407). Specifically, data object 401 and 403 represent exchanged email documents during a conversation as indicated by logical relation 407. Data object 405 represents a text-based data object sent as an attachment to data object 401 as indicated by logical relation 409. The set of attributes included in data objects can specify tag targets associated with each data object, for instance, tag targets 413A, 413B, and 413C. In some instances tag attributes are associated with tag targets including one common term, for instance, tag attributes 413A and 413B are both associated with a tag target including the term "share." In some other instances, tag attributes can be associated with tag targets including two semantically distinct terms, for instance, tag attribute 413C is associated with a tag target including the terms "hot" and "share." In some instances, data objects can include annotations 417 received from a user via user interface 107 (shown in FIG. 1), during a review process. Data objects can have additional descriptive attributes, for instance, a descriptive attribute indicating the type of document they represent as shown at 415A (e-mail type) and 415B (document type). Machine learning model 113 can generate predictions and machine-generated judgements based on the attributes contained by each data object and their logical relations.

In some implementations, annotations such as 417, assignations or corrections of tag targets 413A, 413B, and 413C can be executed asynchronously from training and/or retraining processes executed by the AIML server 200 and machine learning model 113. In other words, user interactions, including annotations and tag signals performed by a user via user interface 107 can be executed asynchronously or decoupled from the training or learning phase executed on machine learning model 113. AIML server 200 monitors user interactions, annotations, tag signals, and corrective tag signals to continuously improve the accuracy of predictions made by machine learning model 113 in a non-intrusive way to the user. Thus, a user can start a review process of data corpus 101 at any time irrespectively of whether or not machine learning model 113 has been trained or has achieved an optimal predictive accuracy. While a user keeps providing inputs to AIML server 200 (e.g., annotations, target signals, corrective target signals, new defined target signals, or other suitable inputs), machine learning model 113 is fit, retrained, and/or adjusted based on new knowledge extracted from such user's inputs.

Active learning refers to applications of iterative machine learning in which user-machine interactions are structured into batches, where the batches are chosen by a machine learning system to optimize some predetermined criterion, such as the number of examples that must be labelled or tagged prior to some prediction quality being obtained. In some implementations, the AIML system uses a combination of active learning and interactive learning. In active learning, machine learning model 113 can control which data objects shall be annotated, while in interactive learning, a machine learning model and a user can cooperate to determine which data objects shall be annotated. In some implementations, the AIML system enables users to have a high level of control over annotations made to data corpus 101. Accordingly, in some instances, users can choose to use traditional active learning tools provided via user interface 107 to structure a data corpus review and select data objects for their review based on user-defined criteria unbeknown to machine learning model 113.

Figure 5:
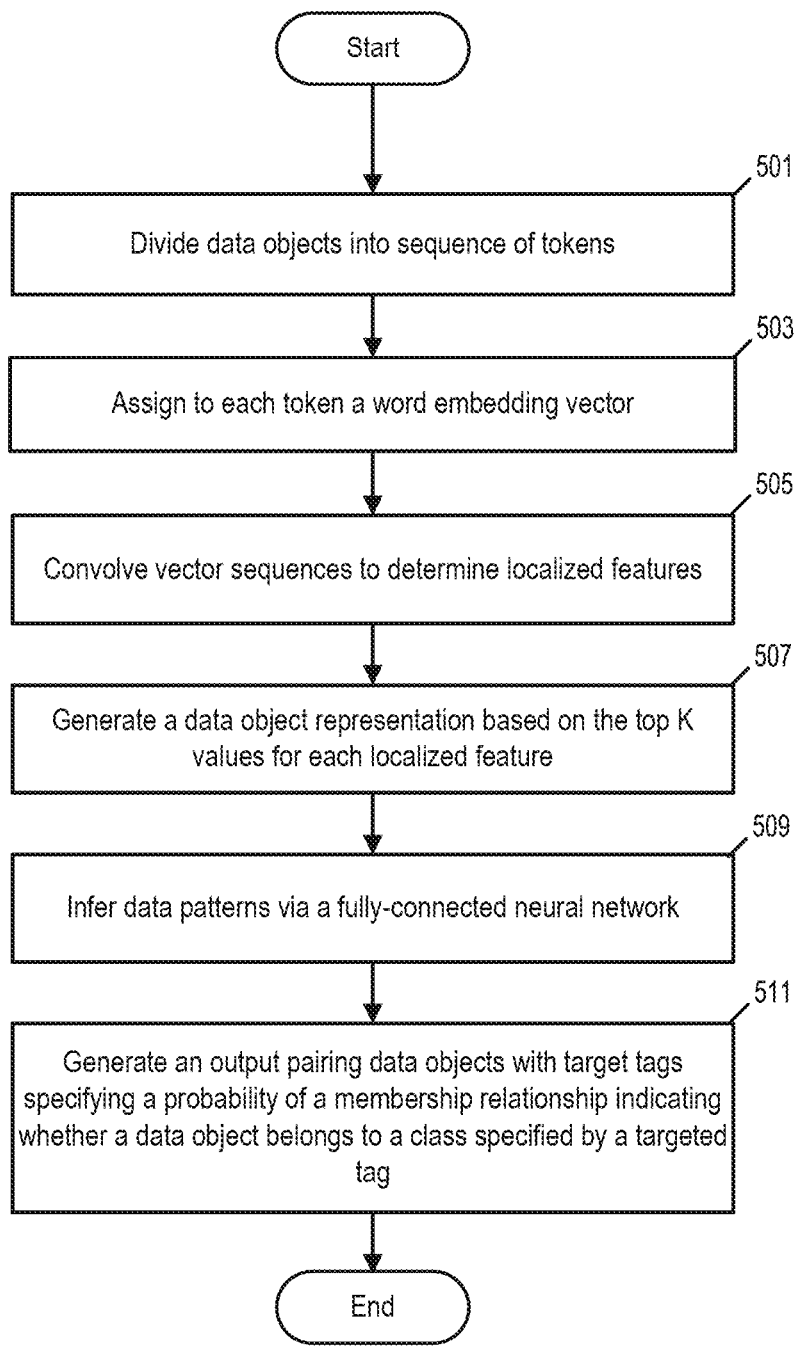
FIG. 5 is a flowchart illustrating a predictive model specifying probabilities of membership relation between data objects and tag targets, according to an embodiment.

In some implementations, the AIML system predicts tag targets for data objects in data corpus 101 by executing a process as the one illustrated in FIG. 5. At 501 the AIML system divides data objects into a sequence of tokens via tokenizer 203 shown in FIG. 2. Thereafter, word embedder 205 assigns to each token a word-embedding vector as shown at 503. Vector sequences are then convolved at 505 to determine localized features. At 507, a data object representation based on the top K values for each of the localized features is generated. A fully-connected neural network infers at 509 data patterns based on the localized features. At 511, an output pairing data objects with tag targets specifying a probability of a membership relation indicating whether a data object belongs to a class specified by a tag target is generated such a membership relation can include a membership degree, a probability, a score or other suitable value to describe the strength and/or direction of the relation. A detailed description of each of the operations described in the flow chart illustrated in FIG. 5 is provided in the below sections.

In some implementations, the AIML system relies on a "continuous asynchronous learning" machine learning strategy. Such strategy is continuous because machine learning model 113 is trained continually during users' review of data corpus 101. The strategy is asynchronous because the users' workflow is decoupled from the training phase of machine learning model 113; the training of machine learning model 113 depends on the ongoing stream of annotations received from user interface 107 during the review of data corpus 101. Advantageously, users can initiate a review of data corpus 101 via user interface 107, even when machine learning model 113 has not been trained at all or has not reached its peak in terms of prediction accuracy. The accuracy of machine learning model 113 increases as users submit more annotations to data corpus 101 during a review process in part because machine learning model 113 is fit or trained iteratively based on new annotations.

In some implementations, machine learning model 113 trained through active or interactive learning behaves as a function approximator whose inputs include a subset of a single data object's attributes and annotations, and whose outputs include sets of parameters of a probability distribution governing whether such a data object belongs to a particular tag target. In some instances, the output can include one set of parameters for each tag target.

Formally, the data corpus is denoted as D. If there are T tag targets, enumerated as $t_1, \ldots, t_T$, the output distributions can be Bernoulli distributions or other suitable distributions so that the outputs can be modeled as a set of probabilities $p_1, \ldots, p_T$ such that $p_i \in [0; 1]$ for $i=1, \ldots, T$. There is an explicitly defined feature extractor E: D→X that encodes each data object into a feature space X based on its attributes and annotations. The model is a function M: X→$[0,1]^T$ that converts features into probabilities, one for each tag target. Thus, the composite map M∘E assigns to each data object a machine prediction regarding its membership in the tag target.

The nature of the feature space and the feature extractor is domain-specific. For data objects that are text-based documents, each data object includes an attribute corresponding to its textual content. In some implementations, the AIML system extracts text from data objects representing text-based documents as a sequence of words, according to a large (e.g., >1 million) vocabulary of size N. Thus, the AIML system's extractor tokenizes the document using a tokenizer (e.g., open source Lucene® or other suitable tokenizer), and then converts each token into a vocabulary index with special tokens to mark unknown and numeric tokens. After extraction, the text of a document with M tokens is contained in a data structure and represented as a sequence of M positive integers, each uniquely associated with an index of a token in the vocabulary, or to a special unknown or numeric token. Likewise, the AIML system extracts other non-textual features from other data object attributes containing a text-based document.

The AIML system implements the best machine learning model among a class of models M indexed by one or more parameters. This class of models is parameterized by a space Θ via a map θ→$M_θ$ for θ∈Θ. The search for a model is accomplished by minimizing a cost function C: M→ℝ over the parameter space, i.e., $$\theta^* = \mathrm{argmin}_{\theta \in \Theta} C(M_\theta) \qquad (1)$$

This optimization can be accomplished in different ways depending on the selected model class. In some implementations, the AIML system uses artificial neural network models, with an optimization method based on stochastic gradient descent with mini-batches and a per-parameter second order learning rate adjustment, such as root mean square propagation, adaptive moment estimation, squared mean over root mean squared cubed, and other suitable optimization method.

In iterative learning, one or more models are trained at various times. The cost function for the $n^{th}$ training session is determined by the currently known tags. Specifically, at the time of training, there is a subset of data objects $D_n \subseteq D$ whose tag state (i.e., membership in one or more tag targets) is known. For a particular $d \in D_n$, the tag state for each of the T trainable tags can be positive, negative, or unknown. In some implementations the AIML system uses a composite cost function such that a subordinate cost function $C_i$ exists for each tag $t_i$ that depends on the model estimates for objects in the training set $D_n$ that are either positive or negative for tag $t_i$. The overall cost function is then the total cost over all tags, $$C(M_\theta) = \Sigma_i C_i(M_\theta^i), \quad \text{where} \quad C_i(M_\theta^i) = \mathbb{E}_{d \sim D_n} [h(M_\theta^i \circ E(d), t_i(d))] \qquad (2)$$

where $M_\theta^i$ is the $i^{th}$ output distribution of, $M_\theta$, $t_i(d)$ is the tag state for the $i^{th}$ tag, and h is a per-object cost common to all tags. In some implementations the per-object cost for AIML system is the log probability (i.e., the overall per tag cost is the cross entropy) with unknown states ignored, so that with Bernoulli outputs, $$h(p, u) = \begin{cases} 0 & \text{if } u = \text{unknown} \\ -\log p & \text{if } u = \text{positive} \\ -\log|1 - p| & \text{if } u = \text{negative} \end{cases} \qquad (3)$$

with the expectation rescaled to take the average only over documents whose tag state is positive or negative. The expectation $\mathbb{E}_{d \sim D_n}[\cdot]$ in Equation 2 is the expected value with $\mathbb{E}$ respect to a distribution over the training data $D_n$ (rescaled to ignore unknowns). Such a distribution can be uniform, or non-uniform distribution, for example, using an attentive module to select instances for training or bootstrapping to develop ensemble learners.

In some implementations, the AIML system uses a machine learning model including a Convolutional Neural Network (CNN) adapted for text, however other suitable machine learning models can be used instead, in sequence or parallel to the CNN model. CNNs are an instance of deep learning technologies. A deep learning model can have several parameterized computational modules called layers that are chained together in a graph structure. Such models are typically trained using stochastic gradient descent by applying the chain rule over the graph to differentiate the cost with respect to each layer's parameters; this process is known as backpropagation. In backpropagation, each graph layer is computed as a function that is differentiable with respect to its parameters and inputs. Each layer performs a feature transformation, with the final layer transforming its input into the desired outputs.

Figure 6:
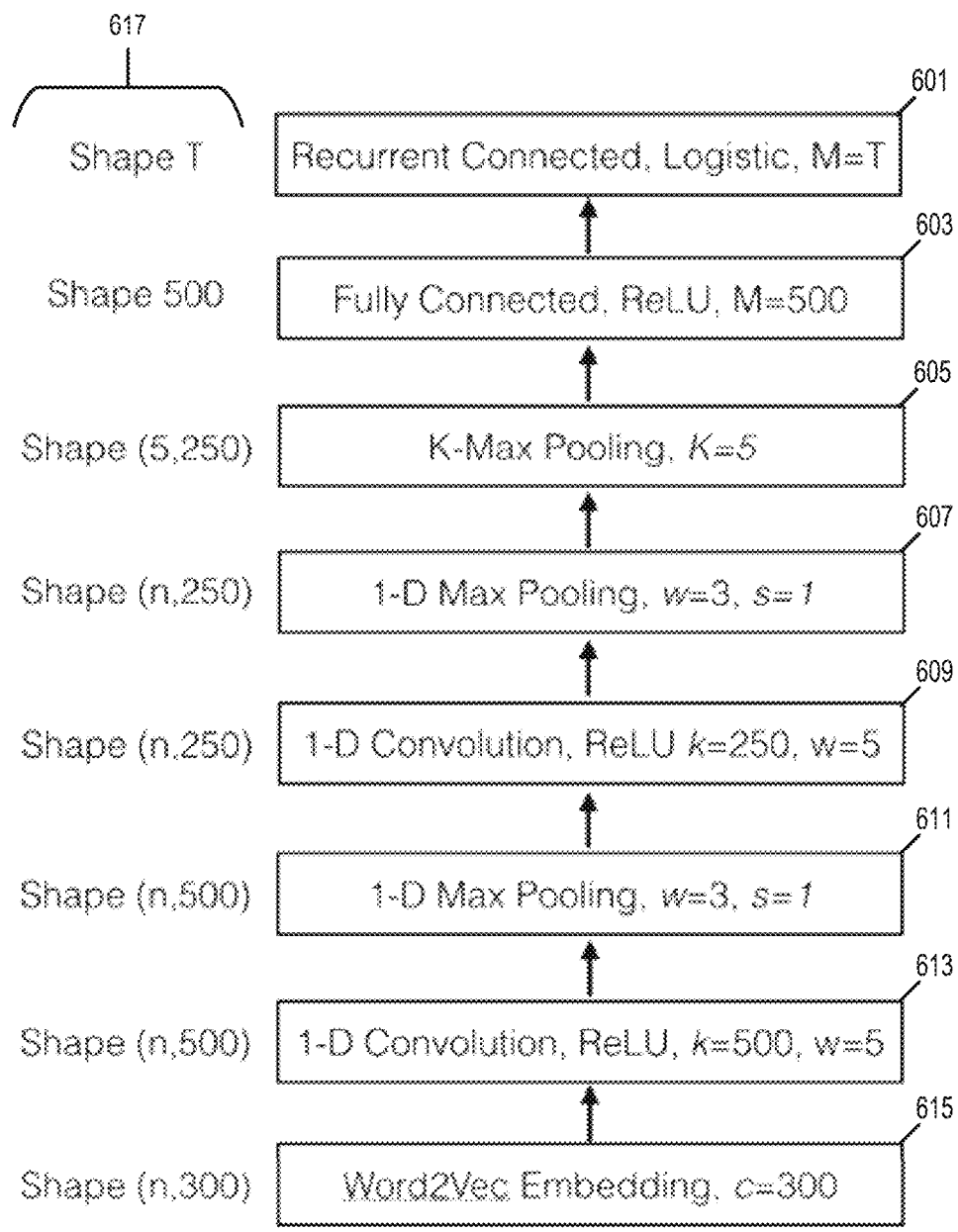
FIG. 6 is an example of a neural network configuration with two convolutional and pooling layers, two pooling layers followed by a K-max pooling layer, a multilayer perceptron, and recurrent output computation, according to an embodiment.

A CNN model for text is shown in FIG. 6. Column 617 shows examples of shapes of data structures produced by each layer. Layer 615 embeds each word of a document or data object into a c-sized numeric vector. Subsequent convolution layers (e.g., 613 and 609) and aggregation layers (e.g., 611, 607, and 605) reduce the length of the numeric vector until a fixed size $n_m$ is reached at fully connected layer with rectified linear units activation 603 followed by final layer 601 with a recurrent set of connections applied a fixed number of times with intermediate rectified linear unit activation and sigmoid activation to generate probability values.

In some implementations, a textual input of varying lengths is passed through an numeric word-embedding followed by a series of convolutional layers interspersed with aggregation layers that transform the sequence either to another sequence (followed by another convolution step) or into a fixed size vector for final processing. Once the sequences have been reduced to a fixed length, a multi-layer perceptron (i.e., a mathematical model to calculate, for instance, a weighted sum of input values) is applied to compute the final classifications.

A word-embedding can be implemented as a lookup dictionary that assigns to each word in a vocabulary a representation as a numeric vector of fixed length c. Its input is a sequence of n word indexes, and its output is a 2-tensor of shape (n, c) such that for each time step m, the output is the numeric vector corresponding to the word index given in the input at time m. The simplest embedding is called a one-hot embedding, where c is the size of the vocabulary and is zero everywhere except at one entry corresponding to the word at that time step, at which point it is one. A different approach includes the use of a smaller sized embedding produced by methods including, for example, two-layer neural networks trained to reconstruct linguistic contexts of words such as Word2Vec™ or other algorithms for obtaining vector representations for words such as GloVe™. In some implementations, the AIML system can produce word-embedding vectors of constant dimension or length c, for example, vectors of a length in the range of [100, 300] dimensions.

A one-dimensional convolution layer (e.g., 613 and/or 609 shown in FIG. 6) applies a set of k filters to a sequence input of length n with c channels. The channels represent the input information available at each time step. For images, these channels can correspond to color information (e.g., RGB); for text, these channels are typically generated as the output of a word-embedding algorithm, i.e., a 2-tensor data structure of shape (n, c).

The output filters represent the output information resulting at each time step. The input to the convolutional layer is the 2-tensor data structure with shape (n, c); that is, the input has length n and c channels. The output is a 2-tensor with shape (n, k); that is, the output has length n and k channels, one for each filter.

A one-dimensional convolutional layer includes two parameters, a 3-tensor data structure K of shape (k, c, w) and a one-dimensional bias vector b of length k. The value w is the window size. For each input time step m, the output for each filter at that output time step is computed based on the inputs in a time window of size w around the $m^{th}$ step of the input such that for input x the output y is determined as:

$$y_{mj} = g\left(b_j + \sum_{i=1}^{w}\sum_{i}^{c} K_{jil} x_{m+l-[\frac{w}{2}],i}\right) \quad (4)$$

for each time m and each filter j, where g is a nonlinear component-wise activation function such as tan h or rectified linear units. In some implementations, the AIML system computes several of such convolutions simultaneously in parallel on graphical processing units (GPUs).

For text classification problems, dynamically sized input sequences are reduced to scalar classification outputs. These reductions are handled by various types of aggregation layers (e.g., 611, 607, and/or 605 shown in FIG. 6). For instance aggregation via max pooling, and aggregation via K-max pooling. In each case, the aggregation layers can be parameter-free.

A one-dimensional max pooling layer includes a window size w and a stride s. The layer receives a 2-tensor data structure of shape (n, c) as input where n is a dynamic sequence length and c is a fixed number of channels and outputs a 2-tensor data structure of shape $$\left(\lceil \frac{n}{s} \rceil, c\right)$$

so that for time step m and channel j, an input x yields output y is the maximum over channel j within a time window around m, $$y_{mj} = \max_{l \in \{1, \ldots, w\}} x_{sm+l-[\frac{w}{2}],j} \quad (5)$$

In some implementations, the AIML system uses stride one pooling, so that the output sequence has the same length as the input sequence. The K-max pooling receives a dynamically sized 2-tensor data structure of shape (n, c) as input and outputs a 2-tensor data structure of shape (K, c) for fixed K. For input x and output y, the output indexed by k and j is determined as:

$$y_{kj} = \operatorname*{order}^k_{m \in \{1, \ldots, n\}} x_{mj} \quad (6)$$

where $\operatorname{order}^k$ takes the $k^{th}$ largest value over the indexed quantities. The standard layer of the neural network is a fully connected layer, which has as parameters a weight matrix W of shape M×N and a bias vector b of length M. It transforms an input of fixed size N into an output of fixed M according to the formula:

$$y = g(W_x + b) \quad (7)$$

where g is a nonlinear activation function as before.

In addition to the standard fully connected layer, the AIML system's final layer stack uses a recurrently connected layer in order to learn the correlations between the various tag probabilities. In addition to the parameters W and b for a fully-connected layer with M=T, the number or tag targets, this recurrent layer has a recurrent weight matrix R of shape MX N, initialized to the identity matrix. The output y for an input x is computed iteratively so that $y_0 = g_0(W_x + b)$ and $$y_t = g_t(W_x + R y_{t-1} + b) \quad (8)$$

Neural networks are Lyapunov-stable and hence $y_t$ converges to a fixed value over time provided that g is fixed and well-behaved. In some instances, the output can be set to $y=y_5$, and for $g_0$ to $g_4$ with a rectified linear units activation. In some other instances, a logistic activation $g(z)=1/(1+e^{-z})$ for $g_5$ to yield output values between zero and one. Eventually, the square matrix R learns the correlation between the various tag targets.

In some implementations, a first convolutional layer with rectified linear units activation is followed by stride one max pooling, and a second convolutional layer is applied again with rectified linear units activation and stride one max pooling. Then K-max pooling is applied, followed by one fully connected layer with rectified linear units activation and then by a fully connected output layer. The output layer can include a recurrent set of connections applied for a fixed number of times with intermediate rectified linear units activation and with sigmoid activation on the final step to generate output probabilities.

In some implementations, the AIML system extends CNNs to train multi-category outputs by adjusting the cost function to aggregate across sub-costs as shown in Equation 2 and applies recurrent connections to learn correlations among outputs. Users of the AIML system can apply positive tags to multiple documents via widgets or controllers included in user interface 107 to perform mass tagging. In some instances however, the tag state of a document may not be known for all documents in a training set. That is, the training set for machine learning model 113 should somehow account for missing data. This is accomplished by excluding the missing data from the sub-costs and adjusting the ensemble averages to ignore the missing data.

In some implementations, the AIML system executes a paging process to documents or data objects during training phases. Such a paging process is executed by the AIML system to cope with documents having widely varying numbers of words. The paging process prevents the AIML system from overconsumption or unnecessary consumption of memory resources because processing documents with widely varying number of words involves the allocation of memory resources geared to support the longest document in a training set or minibatch. Advantageously, the paging process executed by the AIML system can set document data to be computed at a fixed size smaller than the otherwise size dictated by the longest document in a training set. Thus, the AIML system can use a sequence processing approach to process documents at a commercial scale. Moreover, in some instances, the AIML system, can weight parameters of a CNN based on the size of the longer documents because such documents contain more text and hence, should be weighted at a greater degree at the output of a CNN than shorter documents with fewer number of words.

In some implementations, after the word-embedding has been executed, a document's text can be represented as a matrix data structure with shape N×M, where M is the dimension of the word-embedding (e.g., 300), and N is the number of words in the document. As discussed above, in some implementations, convolution operations are executed simultaneously on many documents via graphical processing units or other suitable processors for multidimensional applications.

The AIML system applies deep learning training techniques to group documents together in minibatches and perform gradient descent on the average cost over these batches. Machine learning with minibatches is typically more stable and more computationally efficient than learning from a single document. Because length N can vary from document to document, however, grouping documents into minibatches can be a complex task. In known systems, documents are rectified to the length of the longest document by padding all other documents with zeros. Additionally, minibatches are typically formed from similarly-sized documents to minimize the amount of zero-padding required. When minibatches are formed this way, the stability of minibatch learning, which arises from averaging the error over diverse documents, is compromised by introducing unnecessary within-batch correlations based on document length. Furthermore, longer documents have a smaller effect on the learned text filters in this scheme because a long document has the same effect on the gradients as does a short one.

Figure 7:
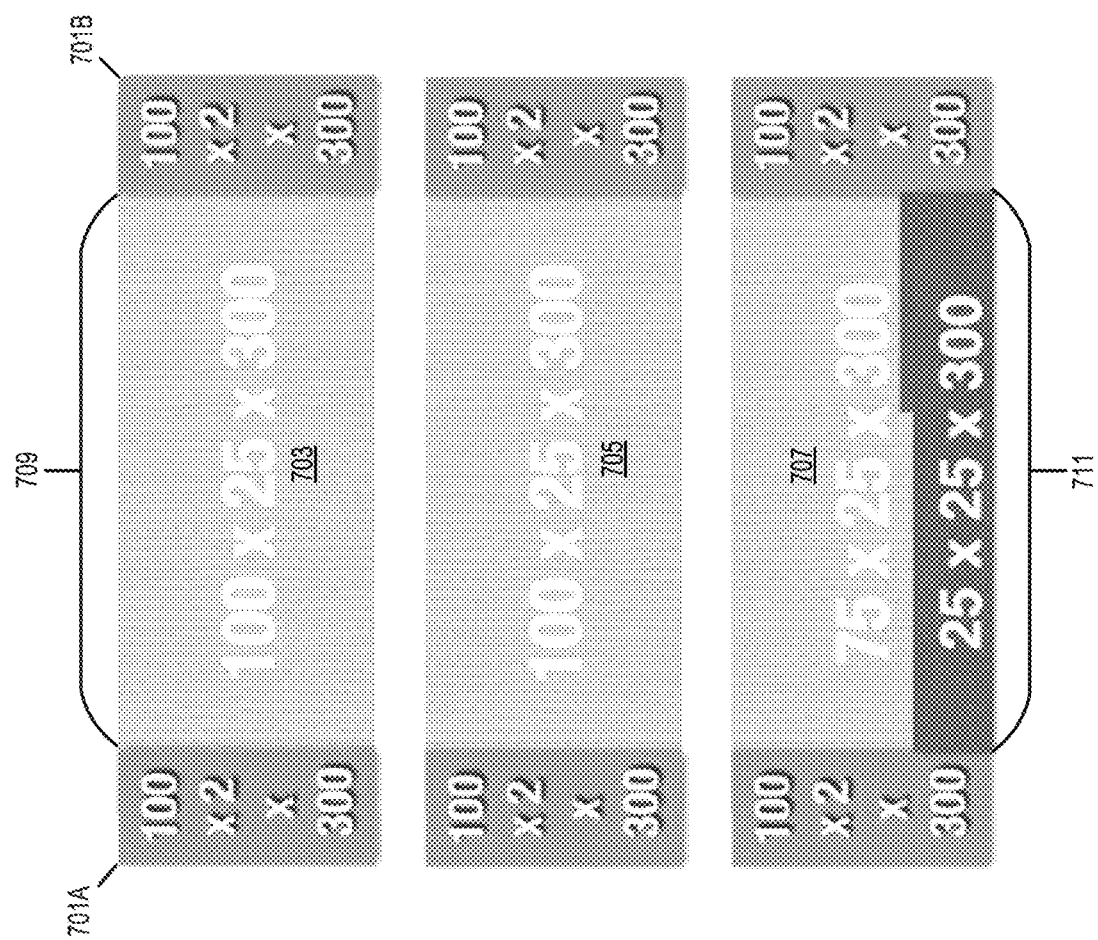
FIG. 7 is a block diagram illustrating the output of a paging process for the production of equally sized memory regions, each memory region configured to contain up to a constant number of pages, according to an embodiment.

The AIML system solves the above technical problem via the paging process. The paging process generates equally-sized memory regions for a document as shown in FIG. 7. For instance, a document or data object with a number of words N=6,865, where each word is word embedded with a vector of length 300 (i.e., M dimension of word-embedding) can be divided in minibatches 703, 705, and 707. A fixed chunk of size C is selected (e.g., C=25 in FIG. 7) and each document is broken out from a matrix data structure or 2-tensor data structure of shape (M, N) into a 3-tensor data structure of shape (B, C, N) as shown at 709, where B is the smallest number such that, B×C>M. Accordingly, for the example shown in FIG. 7, B=275. Thereafter, the document is divided into B pages of fixed size C, padding the document with zeros as necessary to fill out tensors (e.g., 711). In some instances, an overlapping fringe of size F is padded on each side of each chunk (e.g., 701A and 701B) to yield a final page tensor data structure of shape (B, C,+2F, N). For a minibatch containing D documents, the pages for these documents can be stacked along the first tensor axis to form a 3-tensor data structure of shape ($\tilde{B}$, C+2F, N) where $\tilde{B}=\Sigma_i B_i$, the sum over the number of pages for each document. This stacked tensor is then subdivided into equal size minibatches along the first dimension and passed through the network for training, with reassembly inserted prior to the application of K-Max pooling. Because of the fringe (701A and 701B), the convolutional operation yields the same output as if it were applied directly to the M×N document in the correct order, provided some reassembly to remove the fringes and unroll the pages after the convolution.

Figure 8A:
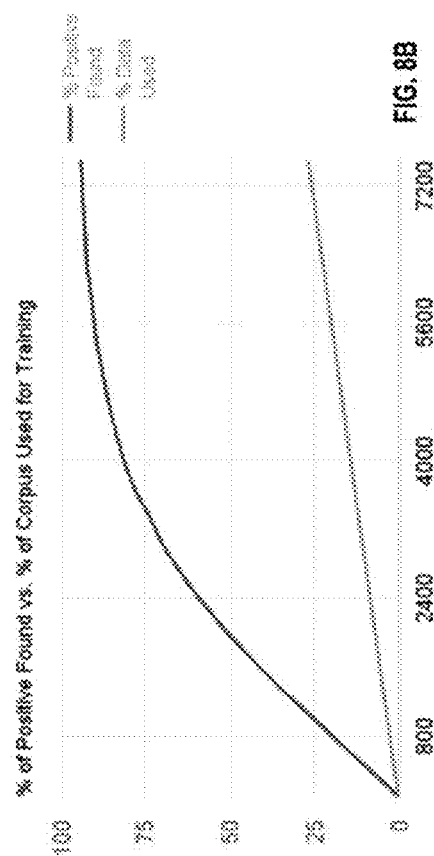
FIG. 8A is a graph illustrating an example of stair-stepping learning behavior in iterative learning.
Figure 8B:
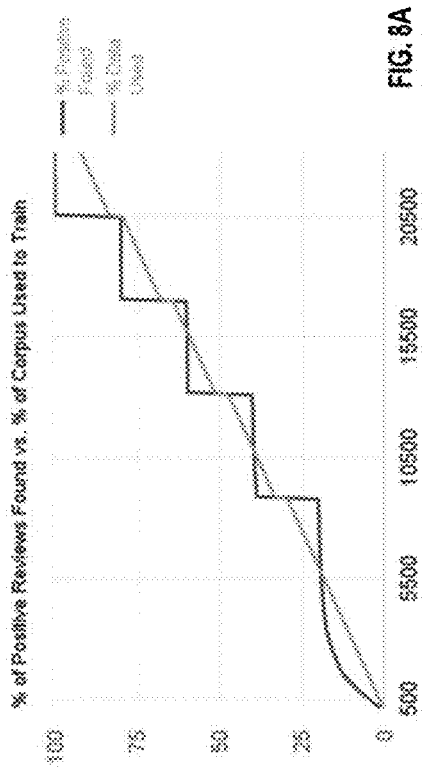
FIG. 8B is an example of iterative learning enabled with a greedy document selection algorithm, according to an embodiment.

In some implementations, the AIML system executes a score stratification sampling process to compensate or correct sub-optimal or deleterious user tagging or annotations that may end-up as part of a training set. Accordingly, the AIML system produces quality predictions despite potentially poor user choices by mitigating the effect of such choices through, for instance, score stratification sampling process. Deleterious effects can result from a greedy review in which users review only those documents most highly recommended by the AIML system. This greedy review approach can reinforce system biases due to the omission of false negatives and deceptively strong positive feedback. FIG. 8A shows an example of this behavior on a dataset of movie reviews. In FIG. 8A, the AIML system correctly identifies a subset of a tag target, but then fails to discover other subsets due to saturation of the training set with documents of a particular type. Over time, a handful of new documents are identified, although most of the system recommendations are erroneous. Once a critical mass of new documents is identified, then a phase shift occurs and the network fixates on a new subset.

The aforementioned fixation occurs because in greedy iterations a training set tends to be augmented with examples that are similar in nature to those examples that machine learning model 113 has already correctly learned. For instance, if a tag target includes two semantically distinct subsets or terms A and B, each containing 1,000 documents. The first 100 positive examples for training can be split with 90 examples of type A and 10 examples of type B such that, subsets of the A type are nine times more frequent in the training data. In such a case, after training, the top 100 scored documents out of the remaining corpus can be split such that 70 data objects are of type A, 5 data objects are of type B, and 25 data objects are of neither type (i.e., are false positives), which occurs because type A dominates the training data. Now, the training set consists of 160 data objects of type A and 15 data objects of type B, and the training data contains more than ten times as many positive data objects of type A than data objects of type B, exacerbating the imbalance. Thus, data objects of type A starve out data objects of type B, meaning that machine learning model's accuracy on the classification of data objects of type B grows much more slowly than it does for data objects of type A. Even once all data objects of type A have been found, the model can still overemphasize type A in in subsequent training phases, taking even longer to find data objects of type B. Thus, fixation can be the result of a sort of class imbalance driven by a greedy iterative review process.

In some implementations, the AIML system overcomes the aforementioned fixation technical problem by counteracting the imbalance of the cost function. The overabundance of type A predictions in the top-scoring documents is an artifact of the machine learning model confidence level in data objects of type A. Hence, type A data objects can be identified based on their high scores when compared to data objects of type B because in contrast, type B data objects are characterized by lower scores. The AIML system can thus, rebalance within-class or within tag target variations preventing fixation as described above by boosting the representation of positive examples that have low scores within the minibatches and limiting the representation of positive examples with high scores.

Formally, for the $n^{th}$ training set with $t>0$, each document (or data object) d in the training set is assigned a score $s_i(d)$ for each tag target $t_i$, where the score is the $i^{th}$ output of the model $M_{\theta_{n-1}}$ from the $(n-1)^{th}$ training set. If $M_{\theta_{n-1}}$ correctly modeled d for tag $t_i$, then the score $s_i(d)$ will be close to one, whereas if it was modeled poorly, the score will be substantially less than one and in some instances as low as zero.

Recall from Equation 2 that the cost for tag $t_i$ is the expected value given by:

$$C_i(M_\theta^i) = \mathbb{E}_{d \sim D_n}[h] \quad (9)$$

In minibatch stochastic gradient descent, the expectation can be estimated by an average over a small subset of the training data chosen uniformly at random. To prevent fixation, the AIML system can replace such a uniform distribution with a distribution over the training data that favors predicted positive but low-scoring documents or data objects with respect a given tag target and predicted negative scoring documents or data objects with respect to the given tag by high-scoring documents or document objects. This new distribution alters the sub-cost forcing machine learning model 113 to correct its errors and pay attention to outliers in the training set that may be indicative of new undiscovered qualities of a given tag target.

In some implementations, such a new distribution assigns a probability to each document d in the training set $D_n$. The distributions of interest have $$\mathbb{P}_u(d) \propto \begin{cases} 0 & \text{if } t_i(d) = \text{unknown} \\ u(s_i(d)) & \text{if } t_i(d) = \text{positive} \\ v(1-s_i(d)) & \text{if } t_i(d) = \text{negative} \end{cases} \quad (10)$$

where u and v are bounded decreasing function over the interval [0,1] such that $u(1)<u(0)$. Candidate functions for u (and v) include $$u(z) = \frac{1}{z+\delta}, u(z) = \exp(-z), \text{ and } u(z) = \log|z+\delta| \quad (11)$$

where $\delta$ is a small value greater than zero. Such distributions can be sampled to select a minibatch using rejection sampling.

In some instances, when a large disparity in scores occurs, high rejection probabilities can result, and thus, the AIML system can use a more computationally efficient distribution based on histograms of the scores. In such a case, the interval [0, 1] can be divided into b buckets of equal size, and the training set $D_n$ can be partitioned into $2b+1$ sets. The first set, $D_n^{unk}$ can include all documents or data objects whose tag state for tag $t_i$ is unknown. The next b sets, $D_n^{k,pos}$ includes all positive documents or data objects d with score $s_i(d)$ in the $k^{th}$ bucket. The final b sets, $D_n^{k,neg}$ include all negative documents or data objects d with inverse score $1-s_i(d)$ in the $k^{th}$ bucket A distribution for tag $t_i$ is then defined by $$\mathbb{P}_u(d) \propto \begin{cases} 0 & \text{if } d \in D_n^{unk} \\ 2|D_n^{k,pos}|^{-1} & \text{if } d \in D_n^{k,pos}, k < \frac{b}{2} \text{ and } |D_n^{k,pos}| > R \\ 2|D_n^{k,neg}|^{-1} & \text{if } d \in D_n^{k,neg}, k < \frac{b}{2} \text{ and } |D_n^{k,neg}| > R \\ |D_n^{k,pos}|^{-1} & \text{otherwise} \\ |D_n^{k,neg}|^{-1} & \text{otherwise} \end{cases} \quad (12)$$

Under this scheme, documents or data objects can be selected so that a roughly equal number of documents or data objects from each score bucket, positive and negative, appear in each minibatch. A factor of 2 can be applied in some cases to upsample prior mispredictions more severely when the number of mispredictions is substantial as determined by a threshold $R>1$.

As a final step, the overall selection of documents or data objects can be handled as a mixture distribution with uniform mixing proportions, so that $$\mathbb{P}(d) = \frac{1}{T}\sum_{i=1}^{T}\mathbb{P}_i(d) \qquad (13)$$

which can be implemented by sampling a tag target, and then sampling a document or data object according to the score buckets for a tag target.

In some implementations, the AIML system uses a quasi-deterministic methods for selecting minibatches approximating the probability distribution described above. The training documents or data objects are selected in groups of a fixed size (e.g., 1,000), and minibatches are produced by partitioning the selected documents or data objects in order.

These groups are chosen in a round-robin fashion by score as follows:
- for the first training, the members of the group are chosen randomly with replacement;
- after the first training, the score buckets are computed. For instance, for an implementation with 10 buckets, output scores can be grouped according to their value, a first bucket with output scores in the interval [0.0, 0.1], a second bucket with output scores in the interval (0.1, 0.2], and so on;
- for each bucket and for each tag target being trained, one positive and one negative document or data object is selected for training from the documents or data objects in the bucket; and
- whenever wrongly scored buckets contain "too many" documents (i.e., more than R above), they are further oversampled by choosing two documents from these buckets rather than one, further coercing the training to account for all training data.

The AIML system makes the process of iterative learning more efficient by applying the score stratification sampling processes discussed above. Accordingly, if a legal team or other suitable group of users review only or primarily the predicted documents, then they are likely to find all the documents that should be tagged while reviewing a smaller percentage of the documents that should not be tagged. The gained efficiency is illustrated as a matter of example on a standard text classification shown in FIG. 8B. The graph shown in FIG. 8B correspond to the same greedy review approach used in FIG. 8A except, the AIML system applies score stratification sampling for FIG. 8B. With score stratification sampling, the stair-stepping learning behavior shown in FIG. 8A is eliminated, and nearly all positive examples are discovered while only using 25% of the available training data.

One of the practical challenges for statistical machine learning is that classification decisions are opaque to users, and often users have difficulty understanding why a machine learning model makes mistakes. This is particularly relevant in iterative learning, where users continually act to improve the quality of the machine training data. In active learning, this difficulty is mitigated by the machine learning model selecting new training data, often with the explicit goal of improving correctness and generalization. In contrast, in interactive learning, the learning process of a machine learning model can be highly dependent on users' interactions with, for instance, data corpus 101. Thus, it is paramount to provide users with tools or instruments to identify causes of misclassifications or mispredictions.

In some implementations, the AIML system can highlight sections of a data object to show to users the factors that induced machine learning model 113 to recommend a particular tag target. This highlighting identifies which input features to the neural network model were determined to be most salient or meaningful for the classification process, more specifically, for a given output of the classification process. In some instances, when salient input features occur within the main text body of a document object, then the AIML system highlights the most salient sequence of text and renders the data object with the highlighted text 903 as shown in FIG. 9 via user interface 107. In some other instances, when such salient input features occur as input of other modalities different from the main text of a data indicate, for instance, metadata 901 in FIG. 9, rendered images, sound or other suitable media, user interface 107 can output such salient input features via a graphical output (e.g., pop-up window), audio notification, or other suitable output.

Figure 10:
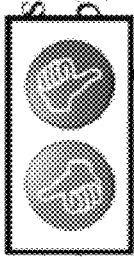
FIG. 10 is an example of an interface and widget to correct, assert, or dismiss a highlighted section of a data object predicted to be associated with a tag target, according to an embodiment.

In some implementations, the AIML system enables users to accept, dismiss, or modify sections of a document object highlighted as salient input features or features having a high membership degree with respect to a given tag target or high probability to be marked with such a given tag target. For instance, in FIG. 10 users can send an accept tag signal (i.e., positive tag signal) or dismiss tag signal (i.e., negative tag signal) with respect to the text highlighted by machine learning model 113 via controller or widget 1001, by clicking on the thumbs-up or thumbs-down buttons. Moreover, users can for example, right click on highlighted section 1003 to remove the highlight, causing the machine learning model to receive a negative tag signal with respect to a tag target for which machine learning model 113 classified the highlighted text as a salient feature. Accordingly, users can provide direct and transparent corrective feedback to machine learning model 113. User feedback is not limited to accepting, rejecting, or modifying sections of text determined to be salient by machine learning model 113. In some implementations, users can likewise be provided with highlighted sections of metadata, images, or other input modality. Users can similarly, accept, dismiss or modify such machine-generated judgements. In some instances, explicit feedback initiated by a user is treated in the same way as an accepted machine generated highlight. Thus, in some implementations, two types of user interactions can exist with respect to highlights:
1. the user accepts or rejects a machine-generated salience judgment highlighted in any input modality; or
2. the user explicitly highlights some portion of any input modality as salient on his own initiative.

In either case, such salience judgments are specific to a particular tag target.

Figure 11:
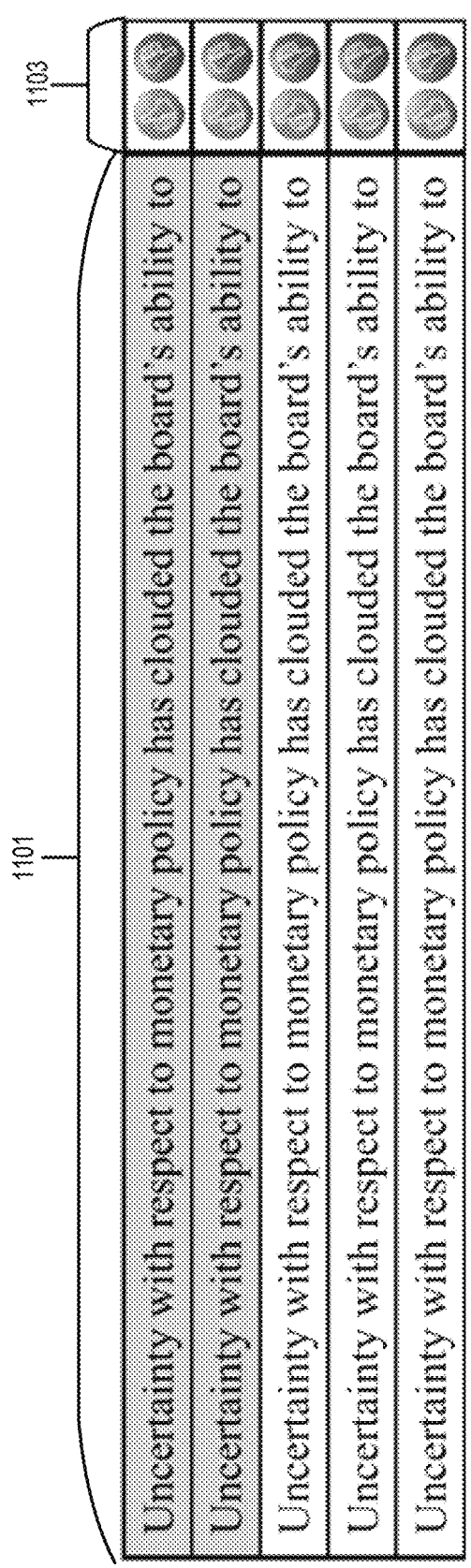
FIG. 11 is an example of an interface with a rendered list of the most salient phrases with respect to a tag target including interactive buttons to assert or dismiss list items, according to an embodiment.

In some implementations, the AIML system renders, via user interface 107 a special list view 1101 shown in FIG. 11 with proposed salient snippets outside of the document context. In this view, the most salient phrases with respect to a tag target are listed along with interactive buttons 1103 to accept or reject the phrases as salient. Thus, users are able to quickly train machine learning model 113 by accepting or rejecting proposed salient features and phrases predicted to be relevant to a given tag target.

In some implementations, a CNN computes a function with an output $M_\theta^i(E(d))$ for each tag target $t_i$ and each document or data object d in data corpus 101. Such a function can be improved by following the gradient of a tag-specific cost $h(M_\theta^i(E(d)), t_i(d))$. After training, the output $M_\theta^i(E(d))$ represents an estimate of the probability indicating whether a tag target $t_i$ should be applied. In some instances, when such a probability is high, then the most important features in support of the judgment of the high probability are those features that would have to change the most under optimization to change the result to a low probability output. For instance if data object 401 (shown in FIG. 4) is predicted with a high probability to be classified with a tag target including the term ["May shared emails"], removing or modifying the "Date" attribute in data object 401 from "May" to "June" can change the prediction's probability from a high probability to a low probability. Accordingly, the value "May 6, 2016" contained in the "Date" attribute field of data object 401 can be considered a salient feature with respect to the tag target including the term ["May shared emails"]. These features correspond to features with high gradients under the cost if in fact a negative label were applied to the document. Thus, to identify the most salient features, one can compute as:

$$S_i(d) = \nabla_E[h(M_\theta^i(E(d)), \text{negative})] \quad (14)$$

which is the gradient of the sub-cost for target $t_i$ when a negative label is given to document d. The AIML system uses function $S_i(d)$ to assign a number to given feature; such a number indicates strength and in which direction such a feature should be changed to support a negative classification. Those features with the largest magnitude are the ones that are likely most salient to determine that $t_i$ should receive a positive label for document or data object d. Moreover, the AIML system converts the value given by the function $S_i(d)$ into a magnitude. Such a conversion is specific to the modality of the input. For instance, for text that is tokenized into words, the magnitude can correspond to the absolute value given by $S_i(d)$ at a given word index (i.e., token) can be used as the magnitude that word. For another example, for metadata the magnitude can correspond to the absolute value given by $S_i(d)$ of a given metadata feature, ignoring zero inputs. For yet another example, for images the magnitude can correspond to the Euclidean norm at each pixel (i.e., the norm over RGBA values). Resulting salience magnitudes can be thus denoted in some instances as $|S_i(d)|$. In some further implementations, the AIML system can analogously use other suitable methods to determine the saliency of features.

In some implementations, the AIML system identifies the most salient regions within each modality. In the case of text-based documents, the document can be split into sentences, and each sentence is given a salience magnitude equal to the total salience of the words in the sentence divided by the log of the sentence length. Such a logarithmic adjustment provides short sentences with a fair chance to compete with respect to salience against longer sentences. Likewise, the logarithmic adjustment limits longer sentences to accrue higher levels of salience or relevance in an open-ended or undetermined way. Accordingly, in some instances, the most salient sentence in a text-based document is the sentence with the largest salience magnitude. In the case of images, the top K most salient points in the image can be selected iteratively with a clearance radius of 5-10% of the image to prevent selection of clustered points. Thus, the first chosen point is the most salient pixel, and the second chosen point chosen is the most salient pixel that is not closer to the first chosen point than a distance corresponding to a value in the interval of [5,10] percent of the image width. Likewise, the third chosen point is the most salient pixel that is not closer to the first chosen point or the second chosen point than a distance corresponding to the value in the interval of [5,10] percent of the image width. Once the image salient points are determined, a region is associated with each point by a line search as follows. A minimum bounding box is initiated and is centered on each point with height and width equal to roughly 5-10% of the image width, based on the clearance introduced above. A salience magnitude is determined for the box as the sum of all salience magnitudes at all pixels inside the bounding box divided by the number of pixels in the box (i.e., the bounding box area). A line search is then performed to select the bounding box centered at the chosen point with the largest salience magnitude. The resulting bounding box out of the K choices is selected as the most salient region.

In some implementations, after the most salient regions have been identified in all modalities, the salience magnitudes for each region for each input modality are scaled for cross-modality comparison. The scaling coefficient can be a fixed quantity for each modality based on experimental and observational judgments. A fixed cutoff is then applied to determine whether any of the regions are sufficiently salient to show to the user. If any regions in any modality have a salience magnitude that exceeds the cutoff, the document is annotated with the salience regions and their normalized magnitude. The user interface 107 can then display these salience judgments graphically to the user.

In some implementations, when a user accepts a machine-generated salience judgement or initiates a salience highlight on any modality, the training set is augmented with a pseudo-document consisting solely of the salient region and annotated as positive for the tag target related to the salience highlight. In some instances, when the salient factor is in metadata, then the pseudo-document includes the salient metadata value and no other information, meaning that it will have zero values for other metadata, empty text, and an empty image in a data object containing the pseudo-document. In some instances, when the salient region is in an image, then the pseudo-document is created with only salient region of the image, empty text, and zero metadata in a data object containing the pseudo-document. When the salient region is in text, then the pseudo-document contains only the salient text, an empty image, and zero metadata in a data object containing the pseudo-document. If multiple salient regions are selected for a particular document, then the salient regions are concatenated to form a single pseudo-document. In some implementations, one positive pseudo-document is created per tag target per document, although a document may generate multiple positive pseudo-documents corresponding to multiple tag targets. These pseudo-documents can be hidden from the user, and added at the backend to a training set. In some instances, when a document that caused the generation of a pseudo-document is removed from data corpus 101, then the pseudo-document is removed as well.

In some implementations, when a user rejects a machine-generated salience judgment, the AIML system produces a pseudo-document with a negative annotation for the tag target related to the salience highlight. As with positive pseudo-documents, in some implementations one negative pseudo-document is produced per tag target per document. In some instances, multiple negative salience decisions can be aggregated into a single pseudo-document just as with positively annotated pseudo-documents.

The data objects with pseudo-documents produced as described above can be used to assemble training sets with samples that are absent of extraneous information, allowing machine learning model 113 to focus on only the salient attributes of the document and thus increasing its predictive accuracy. Pseudo-documents can be scored for the tag target that they are associated with and can be sampled normally during score stratification sampling. The described method for generating salience judgments and incorporating feedback can be used with other suitable differentiable model in addition to CNNs.

Figure 12:
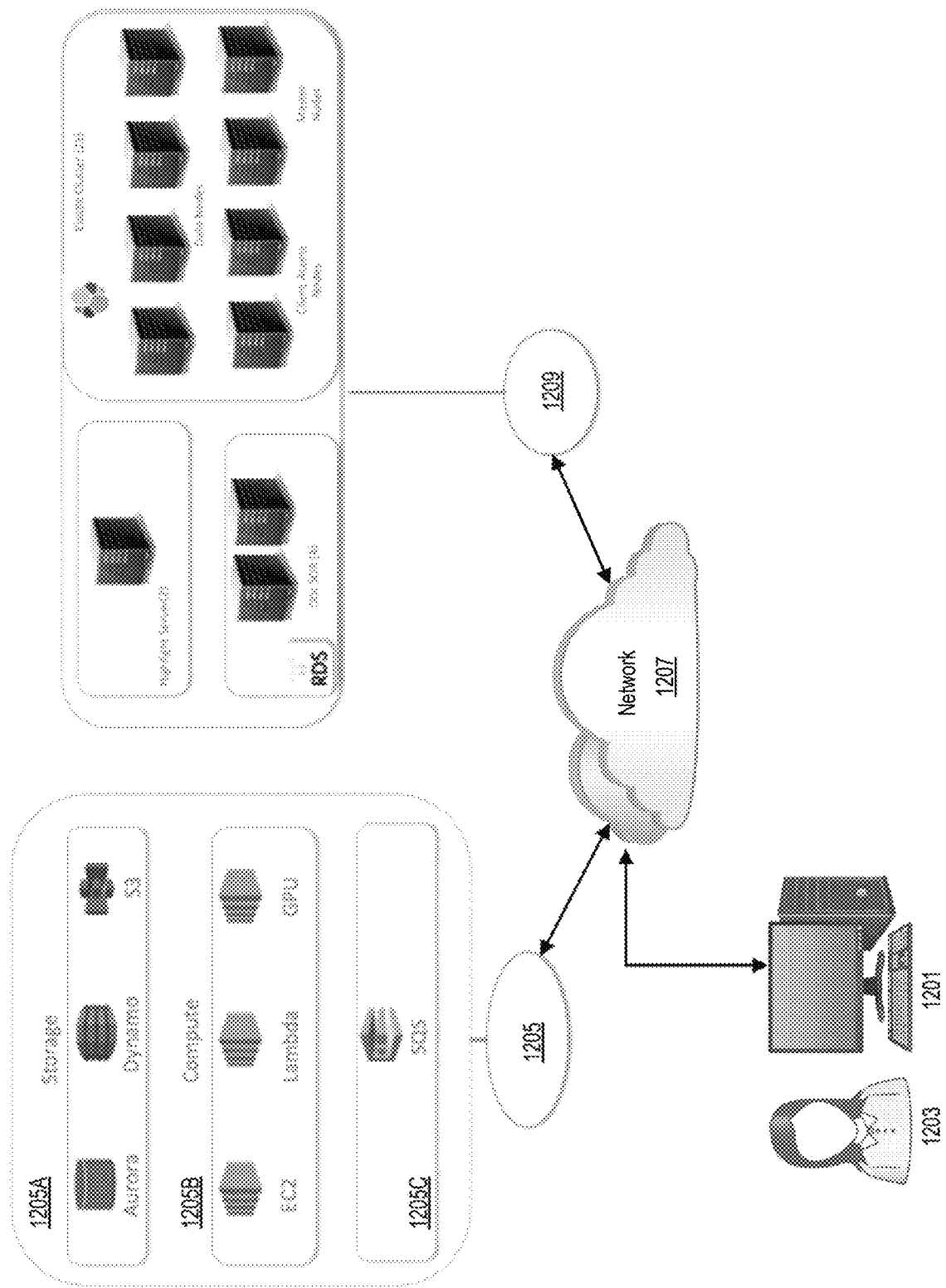
FIG. 12 is an example a distributed implementation of a system for asynchronous and interactive machine learning using word embedding within text-based and multimodal documents, according to an embodiment.

An example of a cloud-based or distributed implementation of the AIML system is discussed with reference to FIG. 12. User 1203 can operate terminal compute device 1201 to access user interface 107 (discussed with reference to FIG. 1) via access point 1205. In some implementations, user interface 107 can be implemented on a message queuing service server (e.g., 1205C). Compute processing system 1205B executes core management processes, tokenization, paging, training, predicting, calculating probabilities, and other processes executed by the AIML system. Storage system 1205A stores data structures including tokenized data objects, embedded word data structures, machine learning models, and other data structures used by the AIML system.

The cluster of servers accessed through access point 1209 includes compute devices or servers to implement an elastic architecture to facilitate parallelization of inputs and outputs. Accordingly, service requests made to the AIML system can be executed in parallel across multiple compute devices.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The invention claimed is:

1. A non-transitory medium storing code representing a plurality of processor-executable instructions, the code comprising code to cause a processor to:

receive, via a user interface, a first series of tag signals, each tag signal from the first series of tag signals indicating at least one membership relation between at least one data object from a data corpus and at least one tag target from a set of tag targets;

train a machine learning model with a seed set to identify further data objects from the data corpus predicted to have at least one membership relation with a single tag target, the single tag target including at least two semantically-distinct data objects;

receive, via the user interface, a second series of tag signals, each tag signal from the second series of tag signals indicating at least one membership relation between at least one data object from a second set of data objects from the data corpus and at least one tag target from the set of tag targets, the second set of data objects includes at least one data object predicted by the machine learning model as having at least one membership relation with the single tag target;

calculate a membership score for each data object from the second set of data objects, the membership score corresponding to a predicted membership degree with respect to the single tag target;

divide a membership scale of the single tag target into a plurality of non-overlapping intervals with positive non-overlapping intervals defined by a pair of positive endpoint numbers and negative non-overlapping intervals defined by a pair of negative endpoint numbers; and partition the second set of data objects into a plurality of training subsets including: (1) a training subset having all data objects from the second set of data objects whose membership relation with respect to the single tag target is undefined, (2) a first set of training subsets, each training subset from the first set of training subsets having data objects with membership scores within a positive non-overlapping interval from the positive non-overlapping intervals, (3) a second set of training subsets, each training subset from the second set of training subsets having data objects with membership scores within a negative non-overlapping interval from the negative non-overlapping intervals;

re-train the machine learning model on data objects included in the training subset, the first set of training subsets, and the second set of training subsets to produce a re-trained machine learning model;

display, at the user interface and based on the re-trained machine learning model, a data object from the data corpus with at least one membership score indicating a membership relation between the data object and at least one tag target; and receive, via the user interface, input feedback in response to display of the data object such that at least one of a section of the data object is modified or such that the at least one membership score indicating the membership relation between the data object and the at least one target tag is modified to cause the machine learning model to improve based on the input feedback.

2. The non-transitory medium of claim 1, wherein the code comprising code to cause the processor to retrain the machine learning model includes code to further cause the processor to:

assign, for each tag signal from the first series and each tag signal from the second series, a weight from a plurality of weights such that that weight is computed as a function of the membership score for an associated data object when the membership score is positive and that weight varies directly with the membership score for the associated data object when the membership score is negative;

the code to re-train including code to re-train the machine learning model based on the plurality of weights for the tag signals from the first series and the tag signals from the second series.

3. The non-transitory medium of claim 1, wherein the code comprising code to cause the processor to retrain the machine learning model includes code to further cause the processor to:

calculate the membership score for each data object from the second set of data objects and that corresponds to a predicted membership degree with respect to the single tag target;

divide the membership scale into a number of 2N non-overlapping intervals of equal length with N positive non-overlapping intervals defined by a pair of positive endpoint numbers and N negative non-overlapping intervals defined by a pair of negative endpoint numbers; and partition the second set of data objects into a number of training subsets equal to 2N+1, the training subsets including: (1) a training subset having all data objects from the second set of data objects whose membership relation with respect to the single tag target is undefined, (2) a first set of training subsets with N training subsets, each training subset from the first set of training subsets having data objects with membership scores within a positive non-overlapping interval from the N positive non-overlapping intervals, (3) a second set of training subsets with N training subsets, each training subset from the second set of training subsets having data objects within a negative non-overlapping from the N negative non-overlapping intervals.

4. The non-transitory medium of claim 1, the code further comprising code to cause the processor to:

select, after receiving the first series of tag signals, the seed set from a first set of data objects upon a determination that a number of data objects from the first set of data objects having at least one membership relation with the single tag target has reached a first predetermined threshold corresponding to a number of elements of a training set;

re-train the machine learning model based on the second set of data objects upon a determination that a number of elements of the second set of data objects matched with the single tag target has reached a second predetermined threshold corresponding to a number of elements of the training set, the second predetermined threshold greater than the first predetermined threshold.

5. The non-transitory medium of claim 1, wherein the single tag target is a first single tag target, the non-transitory computer-readable medium further causes the processor to:

re-train the machine learning model based on the second set of data objects upon a determination that a number of elements of the second set of data objects matched with a second single tag target from the set of tag targets has reached the predetermined threshold corresponding to a number of elements of a training set, the first single tag target different from the second single tag target.

6. The non-transitory medium of claim 1, wherein the code comprising code to cause the processor to re-train the machine learning model includes code to further cause the processor to:

calculate the membership score for each data object from the second set of data objects that corresponds to a predicted membership degree with respect to the single tag target;

calculate a probability value for each data object from the second set of data objects such that data objects with positive and lower membership scores have a higher probability for their inclusion in a training set than data objects with positive and higher membership scores, the data objects with positive and lower membership scores predicted as members of a first semantically-distinct data object, the data objects with positive and higher membership scores predicted as members of a second semantically-distinct data object; and re-train the machine learning model with the training set including data objects based on their respective probabilities.

7. The non-transitory medium of claim 1, wherein the code comprising code to cause the processor to train the machine learning model includes code to further cause the processor to:

select, after receiving the first series of tag signals, the seed set from a first set of data objects upon a determination that a number of data objects from the first set of data objects having at least one membership relation with h single tag target from the set of tag targets has reached a predetermined threshold corresponding to a number of elements of a training set; and generate, for each data object from the seed set, a sequence of numbers, each number in the sequence of numbers corresponding to a vocabulary index value associated with a non-empty set of terms in a vocabulary.

8. The non-transitory medium of claim 1, wherein the code comprising code to cause the processor to train the machine learning model includes code to further cause the processor to:
- select, after receiving the first series of tag signals, the seed set from a first set of data objects upon a determination that a number of data objects from the first set of data objects having at least one membership relation with the single tag target from the set of tag targets has reached a predetermined threshold corresponding to a number of elements of a training set;
- produce a set of two-dimensional tensor objects including a two-dimensional tensor object for each data object from the seed set, each two-dimensional tensor object including a first tensor dimension corresponding to a term index, and a second tensor dimension corresponding to a numeric vector indicating a relationship between the term index and a set of terms from a vocabulary; and
- train a convolutional neural network at least in part with the two-dimensional tensor objects.

9. The non-transitory medium of claim 1, wherein the code comprising code to cause the processor to train the machine learning model includes code to further cause the processor to:
- select, after receiving the first series of tag signals, the seed set from a first set of data objects upon a determination that a number of data objects from the first set of data objects having at least one membership relation with the single tag target from the set of tag targets has reached a predetermined threshold corresponding to a number of elements of a training set, the at least one membership relation of the number of data objects from the seed set having the at least one membership relation with the single tag target from the set of tag targets indicates a positive membership relation.

10. The non-transitory medium of claim 1, wherein the at least one membership relation of the at least one data object predicted by the machine learning model as having the at least one membership relation with the single tag target indicates a positive membership relation.

11. The non-transitory medium of claim 1, wherein the at least one membership relation of the at least one data object predicted by the machine learning model as having the at least one membership relation with the single tag target indicates a negative membership relation.

12. A non-transitory medium storing code representing a plurality of processor-executable instructions, the code comprising code to cause a processor to:
- receive, via a user interface, a first series of tag signals, each tag signal from the first series of tag signals indicating at least one membership relation between at least one data object from a data corpus and at least one tag target from a set of tag targets;
- select, after receiving the first series of tag signals, a seed set from a first set of data objects upon a determination that a number of data objects from the first set of data objects having at least one membership relation with a single tag target from the set of tag targets has reached a predetermined threshold corresponding to a number of elements of a training set;
- train a machine learning model to identify further data objects from the data corpus predicted to have at least one membership relation with the single tag target, including
  - dividing each data object from the seed set into a set of pages;
  - producing a set of three-dimensional tensor objects, each tensor object from the set of three-dimensional tensor objects (a) representing a data object from the seed set, and (b) including a first dimension with a value corresponding to a number of pages of that data object, a second dimension with a value corresponding to a page size of that data object, and a third dimension with a vector having a set of values indicating relationships between an indexed term included in that data object and a set of terms from a vocabulary, the page size corresponding to a fixed size memory region;
  - producing a single tensor by stacking the set of three-dimensional tensor objects along the first dimension of each tensor object from the set of three-dimensional tensor objects;
  - producing a set of equally sized mini-batches by dividing the single stacked tensor along the first dimension, each mini-batch from the set of equally sized mini-batches containing a same number of pages and corresponding to an equally sized memory region; and
  - training the machine learning model with the set of equally sized mini-batches
- display, at the user interface and based on the machine learning model, a data object from the data corpus with at least one membership score indicating a membership relation between the data object and at least one tag target; and
- receive, via the user interface, input feedback in response to display of the data object such that at least one of a section of the data object is modified or such that the at least one membership score indicating the membership relation between the data object and the at least one target tag is modified to cause the machine learning model to improve based on the input feedback.

13. A non-transitory medium storing code representing a plurality of processor-executable instructions, the code comprising code to cause a processor to:
- receive, via a user interface of an asynchronous and interactive machine learning system, a first series of tag signals, each tag signal from the first series of tag signals indicating at least one membership relation between at least one data object from a data corpus and at least one tag target from a non-empty set of tag targets;
- select, via the asynchronous and interactive machine learning system, a seed set from a first set of data objects upon a determination that a number of data objects from the first set of data objects having at least one membership relation with a single tag target from the non-empty set of tag targets has reached a predetermined threshold corresponding to a number of elements of a training set;
- divide, via the asynchronous and interactive machine learning system, each data object from the seed set into a set of pages, each page from the set of pages having a page size corresponding to a fixed size memory region of a memory of the asynchronous and interactive machine learning system;

produce, via the asynchronous and interactive machine learning system, a set of multi-dimensional tensor objects, each tensor object from the set of multi-dimensional tensor objects (a) representing a data object from the seed set, and (b) including a first dimension with a value corresponding to a number of pages of that data object, the page size corresponding to the fixed size memory region of the memory of the asynchronous and interactive machine learning system;

produce, via the asynchronous and interactive machine learning system, a single tensor by stacking the set of multi-dimensional tensor objects along a first dimension of each tensor object from the set of multi-dimensional tensor objects;

produce, via the asynchronous and interactive machine learning system, a set of equally sized mini-batches by dividing the single stacked tensor along the first dimension, each mini-batch from the set of equally sized mini-batches containing a same number of pages and corresponding to an equally sized memory region of the memory of the asynchronous and interactive machine learning system;

train, via the asynchronous and interactive machine learning system, a machine learning model with the set of equally sized mini-batches to identify further data objects from the data corpus predicted to have at least one membership relation with the single tag target;

receive, via the user interface, a second series of tag signals, each tag signal from the second series of tag signals indicating at least one membership relation between at least one data object from a second set of data objects and at least one tag target from the non-empty set of tag targets, the second set of data objects includes at least one data object predicted by the machine learning model as having at least one membership relation with the single tag target;

re-train the machine learning model based on the second set of data objects to produce a re-trained machine learning model;

display, via the asynchronous and interactive machine learning system, via the user interface and based on the re-trained machine learning model, a document object from the data corpus with a magnitude value corresponding to a membership degree between the document object and at least one tag target from the non-empty set of tag targets; and receive, via the user interface, feedback in response to display of the document object via an accept input, a dismiss input, an input to modify sections in the document object or an input to modify magnitude values corresponding to membership degrees, causing the machine learning model to improve based on the feedback.

14. The non-transitory medium of claim 13, wherein each tensor object from the multi-dimensional tensor objects further includes (i) a second dimension with a value corresponding to a page size of that data object, and (iii) a third dimension with a vector having a set of values indicating relationships between an indexed term included in that data object and a set of terms from a vocabulary.

15. The non-transitory medium of claim 13, wherein the code comprising code to cause the processor to re-train the machine learning model includes code to further cause the processor to:
calculate a membership score for each data object from the second set of data objects that corresponds to a predicted membership degree with respect to the single tag target;
calculate a probability value for each data object from the second set of data objects such that data objects with positive and lower membership scores have a higher probability for their inclusion in the training set than data objects with positive and higher membership scores, the data objects with positive and lower membership scores predicted as members of a first semantically-distinct data object, the data objects with positive and higher membership scores predicted as members of a second semantically-distinct data object; and
re-train the machine learning model with the training set including data objects based on their respective probabilities.

16. The non-transitory medium of claim 13, wherein the code comprising code to cause the processor to train the machine learning model includes code to further cause the processor to:
generate, for each data object from the seed set, a sequence of numbers, each number in the sequence of numbers corresponding to a vocabulary index value associated with a nonempty set of terms in a vocabulary.

17. The non-transitory medium of claim 13, wherein the code comprising code to cause the processor to train the machine learning model includes code to further cause the processor to:
produce a set of two-dimensional tensor objects including a two-dimensional tensor object for each data object from the seed set, each two-dimensional tensor object including a first tensor dimension corresponding to a term index, and a second tensor dimension corresponding to a numeric vector indicating a relationship between the term index and a set of terms from a vocabulary; and
train a convolutional neural network at least in part with the two-dimensional tensor objects.

18. The non-transitory medium of claim 13, wherein the at least one membership relation of the number of data objects from the seed set having the at least one membership relation with the single tag target from the non-empty set of tag targets indicates a positive membership relation.

19. The non-transitory medium of claim 13, wherein the at least one membership relation of the at least one data object predicted by the machine learning model as having the at least one membership relation with the single tag target indicates a positive membership relation.

20. The non-transitory medium of claim 13, wherein the at least one membership relation of the at least one data object predicted by the machine learning model as having the at least one membership relation with the single tag target indicates a negative membership relation.

* * * * *